United States Patent
Takayama et al.

(10) Patent No.: US 10,945,380 B2
(45) Date of Patent: Mar. 16, 2021

(54) INDOOR AIR-CONDITIONING DEVICE AND CONTAINER REFRIGERATION DEVICE EQUIPPED WITH SAME

(71) Applicant: DAIKIN INDUSTRIES, LTD., Osaka (JP)

(72) Inventors: Maho Takayama, Osaka (JP); Noritaka Kamei, Osaka (JP); Yuusuke Fujimoto, Osaka (JP); Masataka Nakano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 49 days.

(21) Appl. No.: 16/092,347

(22) PCT Filed: Apr. 13, 2017

(86) PCT No.: PCT/JP2017/015171
§ 371 (c)(1),
(2) Date: Oct. 9, 2018

(87) PCT Pub. No.: WO2017/179669
PCT Pub. Date: Oct. 19, 2017

(65) Prior Publication Data
US 2019/0141903 A1    May 16, 2019

(30) Foreign Application Priority Data

Apr. 15, 2016   (JP) .............................. JP2016-082481

(51) Int. Cl.
*A23B 7/04* (2006.01)
*A23B 7/148* (2006.01)
(Continued)

(52) U.S. Cl.
CPC .............. *A01F 25/14* (2013.01); *A01F 25/00* (2013.01); *A23B 7/04* (2013.01); *A23B 7/148* (2013.01);
(Continued)

(58) Field of Classification Search
CPC ......................... F25D 11/003; B60H 1/00014
See application file for complete search history.

(56) References Cited

U.S. PATENT DOCUMENTS 4,716,739 A * 1/1988 Harris .................... A23B 7/148
62/78
4,961,322 A * 10/1990 Oguma ................. A23L 3/3418
426/419
(Continued)

FOREIGN PATENT DOCUMENTS

| JP | H4-41315 A | 2/1992 |
| JP | 2015-072103 A | 4/2015 |

(Continued)

OTHER PUBLICATIONS

English Translation of JP H04-041315 cited by applicant.*
(Continued)

*Primary Examiner* — Nelson J Nieves
(74) *Attorney, Agent, or Firm* — Birch, Stewart, Kolasch & Birch, LLP.

(57) ABSTRACT

A CA system includes a gas supply device which performs a gas supply operation of supplying nitrogen-enriched air into a container, and a controller which performs the gas supply operation so that the inside air has a desired composition. The controller performs carbon dioxide priority control in which the controller performs the gas supply operation if an oxygen concentration of the inside air is equal to or higher than a ceiling concentration higher than a target oxygen concentration, stops the gas supply operation
(Continued)

if a carbon dioxide concentration of the inside air is lowered to a critical concentration lower than a target carbon dioxide concentration, and restarts the gas supply operation if the carbon dioxide concentration of the inside air has reached a restart concentration higher than the target carbon dioxide concentration through breathing of the plants.

10 Claims, 12 Drawing Sheets

(51) Int. Cl.
    *F25D 11/00*     (2006.01)
    *F25D 23/00*     (2006.01)
    *A01F 25/14*     (2006.01)
    *A01F 25/00*     (2006.01)
    *F24F 110/65*     (2018.01)
    *F24F 110/50*     (2018.01)

(52) U.S. Cl.
    CPC .............. *F25D 11/00* (2013.01); *F25D 23/00* (2013.01); *A01F 2025/147* (2013.01); *F24F 2110/50* (2018.01); *F24F 2110/65* (2018.01)

(56) References Cited

U.S. PATENT DOCUMENTS

| | | | | |
|---|---|---|---|---|
| 5,438,841 A * | 8/1995 | Cahill-O'Brien | ..... | A23L 3/3418 426/418 |
| 5,457,963 A * | 10/1995 | Cahill-O'Brien | ...... | A23B 7/148 62/78 |
| 5,462,485 A * | 10/1995 | Kinkead | ............. | F24F 11/0001 454/256 |
| 5,649,995 A * | 7/1997 | Gast, Jr. | ................. | A23L 3/3418 426/419 |
| 7,089,751 B2 * | 8/2006 | Fleming, Jr. | .......... | F25D 17/042 62/78 |
| 10,168,092 B2 * | 1/2019 | Tanaka | .................. | A23L 3/3418 |
| 10,345,014 B2 * | 7/2019 | Tanaka | .................. | F25D 17/042 |
| 2006/0246183 A1 * | 11/2006 | Bonnefous | .............. | A01F 25/14 426/106 |
| 2009/0211298 A1 * | 8/2009 | Saul | ....................... | A23L 3/3418 62/640 |
| 2013/0019961 A1 * | 1/2013 | Rogers | ..................... | F24F 11/30 137/334 |
| 2013/0340444 A1 * | 12/2013 | Bryant | ..................... | B60H 1/32 62/62 |
| 2014/0202183 A1 * | 7/2014 | Chadwick | ............. | A23L 3/3418 62/78 |
| 2016/0227802 A1 | 8/2016 | Tanaka et al. | | |
| 2016/0245555 A1 * | 8/2016 | Tanaka | ................. | A23B 7/0425 |
| 2017/0112171 A1 * | 4/2017 | Cermak | ................. | B01D 53/22 |
| 2017/0355518 A1 * | 12/2017 | Zita | ...................... | B65D 88/745 |

FOREIGN PATENT DOCUMENTS

| | | | |
|---|---|---|---|
| WO | WO 2015/049878 A1 | 4/2015 | |
| WO | WO-2015049840 A1 * | 4/2015 | ............ F25D 11/003 |

OTHER PUBLICATIONS

International Search Report for PCT/JP2017/015171 (PCT/ISA/210) dated Jun. 27, 2017.

Extended European Search Report dated Sep. 17, 2020 in corresponding European Application No. 20177413.0.

\* cited by examiner

US 10,945,380 B2

INDOOR AIR-CONDITIONING DEVICE AND CONTAINER REFRIGERATION DEVICE EQUIPPED WITH SAME

TECHNICAL FIELD

The present invention relates to an inside air control system which controls the composition of the air in a storage containing plants, and a container refrigeration apparatus including the same.

BACKGROUND ART

Container refrigeration apparatuses including a refrigerant circuit performing a refrigeration cycle have been used to cool the air in a container for use in, e.g., marine transportation (see, e.g., Patent Document 1). The container is loaded with plants such as bananas and avocados, for example. The plants breathe by absorbing oxygen in the air and releasing carbon dioxide into the air even after they have been harvested. The plants lose their nourishment and moisture as they breathe. Thus, the degree of freshness of the plants decreases. Thus, the oxygen concentration in the container is preferably lowered not to cause breathing problems.

Patent Document 1 discloses a container refrigeration apparatus including a gas supply device. In this device, an adsorbent adsorbing a nitrogen component in the air when pressurized is used to produce nitrogen-enriched air having a higher nitrogen concentration and a lower oxygen concentration than the air. The nitrogen-enriched air is supplied into the container to lower the oxygen concentration of the inside air of the container, thereby reducing the respiration rate of the plants. According to Patent Document 1, the gas supply device supplies the nitrogen-enriched air into the container to lower the oxygen concentration of the inside air and the respiration rate of the plants, so that the plants are easily kept fresh.

For some plants, it is necessary to keep the oxygen concentration of the inside air low, and a carbon dioxide concentration of the inside air relatively high, in order to keep them fresh. Further, to keep some of such plants (e.g., blueberries and asparaguses) fresh, it is important to keep the carbon dioxide concentration of the inside air high rather than to keep the oxygen concentration of the inside air low.

Therefore, in the case where the container is loaded with the plants for which it is important to keep the carbon dioxide concentration high rather than to keep the oxygen concentration low for maintaining the freshness, first, carbon dioxide is introduced into the container to increase the carbon dioxide concentration of the inside air to a desired level, and then the nitrogen-enriched air is supplied into the container so that the oxygen concentration of the inside air is lowered. In this way, the composition of the inside air is controlled to a desired level.

CITATION LIST

Patent Document

[Patent Document 1] Japanese Unexamined Patent Publication No. 2015-072103

SUMMARY OF THE INVENTION

Technical Problem

In general, when a gas is introduced into the container, the inside air is released out of the container by the same amount as the introduced gas. Thus, if the nitrogen-enriched air is supplied after the introduction of carbon dioxide as described above, carbon dioxide that has been introduced first is released out of the container during the supply of the nitrogen-enriched air. As a result, the carbon dioxide concentration of the inside air decreases during the introduction of the nitrogen-enriched air. Therefore, the plants in the container cannot be kept fresh if it is important for the plants to keep the carbon dioxide concentration high rather than to keep the low oxygen concentration low.

In view of the foregoing background, it is therefore an object of the present invention to provide an inside air control system capable of lowering the oxygen concentration of the inside air while keeping the carbon dioxide concentration at a target carbon dioxide concentration, and a container refrigeration apparatus including the inside air control system.

Solution to the Problem

A first aspect of the present disclosure is directed to an inside air control system including: a gas supply device (30) which performs a gas supply operation of supplying nitrogen-enriched air having a higher nitrogen concentration and a lower oxygen concentration than outside air into a storage (11) storing breathing plants (15); and a controller (55) which controls the gas supply operation so that inside air of the storage (11) has a desired composition, wherein the controller (55) performs carbon dioxide priority control in which the controller (55) performs the gas supply operation if an oxygen concentration of the inside air is equal to or higher than a ceiling concentration higher than a target oxygen concentration, stops the gas supply operation if a carbon dioxide concentration of the inside air is lowered to a critical concentration lower than a target carbon dioxide concentration, and restarts the gas supply operation if the carbon dioxide concentration of the inside air has reached a restart concentration higher than the target carbon dioxide concentration through breathing of the plants (15) while the gas supply operation is being stopped.

According to the first aspect of the present disclosure, the controller (55) controls the gas supply operation of supplying into the storage (11) the nitrogen-enriched air having a higher nitrogen concentration and a lower oxygen concentration than the outside air by the gas supply device (30). Thus, the composition of the inside air of the storage (11) is controlled to be a desired composition.

In the first aspect, the controller (55) performs the carbon dioxide priority control of giving priority to, not the control of the oxygen concentration of the inside air, but the control of the carbon dioxide concentration of the inside air. In the carbon dioxide priority control, the gas supply operation is stopped if the carbon dioxide concentration of the inside air has lowered to the critical concentration lower than the target carbon dioxide concentration, even in a situation where the oxygen concentration of the inside air is equal to or higher than the ceiling concentration higher than the target oxygen concentration and therefore needs to be lowered. Then, if the carbon dioxide concentration of the inside air has increased through the breathing of the plants (15), and reached the restart concentration higher than the target carbon dioxide concentration, the gas supply operation is restarted. As a result, the oxygen concentration of the inside air is lowered toward the target oxygen concentration, while maintaining the carbon dioxide concentration of the inside air around the target carbon dioxide concentration. That is, in the carbon dioxide priority control, priority is given to, not the quick control of the oxygen concentration of the inside air to be the target oxygen concentration, but the keeping of the carbon dioxide concentration of the inside air around the target carbon dioxide concentration.

A second aspect of the present disclosure is an embodiment of the first aspect. In the second aspect, if the carbon dioxide concentration of the inside air is lower than a predetermined onset concentration higher than the target carbon dioxide concentration at the onset of the carbon dioxide priority control, the controller (55) does not perform the gas supply operation until the carbon dioxide concentration of the inside air reaches the onset concentration through breathing of the plants (15), and performs the gas supply operation after the carbon dioxide concentration of the inside air has reached the onset concentration.

Once the gas supply operation is started, the carbon dioxide concentration of the inside air also decreases as the oxygen concentration of the inside air decreases. Thus, if the gas supply operation is started when the carbon dioxide concentration of the inside air is still low, the carbon dioxide concentration of the inside air cannot be increased to the target carbon dioxide concentration, but is lowered conversely. This requires longer time to bring the carbon dioxide concentration to the target carbon dioxide concentration.

To cope with this drawback, according to the second aspect, if the carbon dioxide concentration of the inside air is lower than the predetermined onset concentration higher than the target carbon dioxide concentration at the onset of the carbon dioxide priority control, the gas supply operation is not performed until the carbon dioxide concentration of the inside air reaches the onset concentration through the breathing of the plants (15), but is performed after the carbon dioxide concentration of the inside air has reached the onset concentration. The gas supply operation performed after the carbon dioxide concentration has reached the onset concentration quickly brings the carbon dioxide concentration of the inside air to the target carbon dioxide concentration after the onset of the carbon dioxide priority control. Then, repeating the stop and restart of the gas supply operation keeps the carbon dioxide concentration of the inside air around the target carbon dioxide concentration.

A third aspect of the present disclosure is an embodiment of the first or second aspect. In the third aspect, the controller (55) selectively performs the carbon dioxide priority control and oxygen priority control in which, if the oxygen concentration of the inside air is equal to or higher than the ceiling concentration, the gas supply operation is performed to lower the oxygen concentration of the inside air, irrespective of the carbon dioxide concentration of the inside air.

In the third aspect, the controller (55) selectively performs the oxygen priority control and the carbon dioxide priority control. In the oxygen priority control, the gas supply operation is performed to lower the oxygen concentration of the inside air, irrespective of the carbon dioxide concentration of the inside air, when the oxygen concentration of the inside air is equal to or higher than the ceiling concentration higher than the target oxygen concentration. In the carbon dioxide priority control, the gas supply operation is controlled in accordance with the carbon dioxide concentration of the inside air to lower the oxygen concentration while maintaining the carbon dioxide concentration of the inside air around the target carbon dioxide concentration.

A fourth aspect of the present disclosure is an embodiment of the third aspect. the controller (55) performs, if the oxygen concentration of the inside air is equal to or higher than the ceiling concentration, a predetermined priority determination to determine which of the oxygen priority control and the carbon dioxide priority control is performed.

In the fourth aspect, if the oxygen concentration of the inside air is equal to or higher than the ceiling concentration higher than the target oxygen concentration, and therefore needs to be lowered, the controller (55) performs the predetermined priority determination so as to determined which of the oxygen priority control of giving priority to the lowering of the oxygen concentration of the inside air, or the carbon dioxide priority control of giving priority to the keeping of the carbon dioxide concentration of the inside air around the target carbon dioxide concentration than to the lowering of the oxygen concentration of the inside air. Then, performing the control selected through the priority determination brings the oxygen concentration and carbon dioxide concentration of the inside air to their target concentrations.

A fifth aspect of the present disclosure is an embodiment of the fourth aspect. In the fifth aspect, the controller (55) determines to perform the carbon dioxide priority control through the priority determination if the target carbon dioxide concentration is higher than a predetermined value.

In the fifth aspect, if the target carbon dioxide concentration is higher than the predetermined value, the controller (55) estimates that priority should be given to, not the lowering of the oxygen concentration of the inside air, but the keeping of the carbon dioxide concentration of the inside air around the target carbon dioxide concentration, and thus, determines in the priority determination to perform the carbon dioxide priority control.

A sixth aspect of the present disclosure is an embodiment of the fourth aspect. In the sixth aspect, the controller (55) determines to perform the carbon dioxide priority control through the priority determination if the sum of the oxygen concentration and carbon dioxide concentration of the inside air is higher than a predetermined reference concentration which is equal to or higher than 21%.

Note that the gas supply operation merely reduces the oxygen concentration and carbon dioxide concentration of the inside air. Therefore, the sum of the oxygen concentration and carbon dioxide concentration of the inside air would not exceed 21%, which is the sum of the oxygen concentration and carbon dioxide concentration of the atmospheric air.

Therefore, in the sixth aspect, if the sum of the oxygen concentration and carbon dioxide concentration of the inside air is higher than the predetermined reference concentration equal to or higher than 21%, the controller (55) estimates that carbon dioxide has been introduced into the storage (11), and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control.

A seventh aspect of the present disclosure is an embodiment of the fourth aspect. In the seventh aspect, the controller (55) determines to perform the carbon dioxide priority control through the priority determination if the carbon dioxide concentration of the inside air has increased by a value equal to or higher than a predetermined value in a predetermined period during the gas supply operation.

Note that the gas supply operation merely reduces the carbon dioxide concentration of the inside air. Therefore, while the inside air control system is running, the carbon dioxide concentration of the inside air would not increase by an amount equal to or more than the amount of carbon dioxide increased through the breathing of the plants (15) in a predetermined period.

Therefore, in the seventh aspect, if the carbon dioxide concentration of the inside air has increased by an amount equal to or more than the amount of carbon dioxide increased through the breathing of the plants (15) in a predetermined period, the controller (55) estimates that carbon dioxide has been introduced into the storage (11), and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control.

An eighth aspect of the present disclosure is an embodiment of the fourth aspect. In the eighth aspect, the controller (55) determines to perform the carbon dioxide priority control through the priority determination if the power of the inside air control system is turned on within one day of turning of the power of the inside air control system from on to off and the carbon dioxide concentration of the inside air has increased by a value equal to or higher than a predetermined value as compared to the carbon dioxide concentration of the inside air just before the power of the inside air control system was turned off.

Note that when the power of the inside air control system is off, the composition of the inside air varies only through the breathing of the plants (15). Thus, if the power of the inside air control system is turned on within one day of the turning off of the power of the inside air control system, the carbon dioxide concentration of the inside air does not increase in a period between the turning off and the turning on by an amount equal to or more than the amount increased through the breathing of the plants (15).

Therefore, in the eighth aspect, if the power of the inside air control system is turned on within one day of the turning of the power of the inside air control system from on to off and the carbon dioxide concentration of the inside air has increased by a value equal to or more than the predetermined value as compared with the concentration just before the power of the inside air control system was turned off, the controller (55) estimates that carbon dioxide has been introduced into the storage (11) while the power of the inside air control system is off, and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control.

A ninth aspect of the present embodiment is an embodiment of the fourth aspect. In the ninth aspect, the controller (55) performs carbon dioxide priority control in which the controller (55) sets a carbon dioxide priority flag active if the controller (55) has determined to perform the carbon dioxide priority control through the priority determination, and sets the carbon dioxide priority flag inactive if the controller (55) has determined to perform the oxygen priority control through the priority determination and a predetermined reset condition is met, and the controller (55) determines to perform the carbon dioxide priority control through the priority determination if the power of the inside air control system has been turned from off to on and the carbon dioxide priority flag is active.

In some cases, the power of the inside air control system may be unintentionally turned off even if the carbon dioxide priority control is being performed in accordance with a determination to perform the carbon dioxide priority control through the priority determination.

Therefore, in the ninth aspect, having determined to perform the carbon dioxide priority control through the priority determination, the controller (55) sets the carbon dioxide priority flag active, in case of such a situation. If the carbon dioxide priority flag is active when the power of the inside air control system is turned from off to on, the controller (55) estimates that the carbon dioxide priority control needs to be continued in the priority determination, and continues the carbon dioxide priority control.

A tenth aspect of the present disclosure is directed to a container refrigeration apparatus (60) including the inside air control system of any one of the first to ninth aspect, and a refrigerant circuit (20) which performs a refrigeration cycle, wherein the container refrigeration apparatus cools inside air of a container serving as the storage (11), and controls a composition of the inside air.

Advantages of the Invention

According to the first aspect of the disclosure, the controller (55) performs the gas supply operation if an oxygen concentration of the inside air is equal to or higher than a ceiling concentration higher than a target oxygen concentration, stops the gas supply operation if a carbon dioxide concentration of the inside air is lowered to a critical concentration lower than a target carbon dioxide concentration, and restarts the gas supply operation if the carbon dioxide concentration of the inside air has reached a restart concentration higher than the target carbon dioxide concentration through breathing of the plants (15) while the gas supply operation is being stopped. In the carbon dioxide priority control, the gas supply operation is performed or stopped in accordance with the carbon dioxide concentration of the inside air. Thus, in a situation where the oxygen concentration of the inside air needs to be lowered, the oxygen concentration of the inside air can be lowered to the target oxygen concentration while keeping the carbon dioxide concentration of the inside air around the target carbon dioxide concentration. Therefore, unlike commonly known apparatuses, the carbon dioxide concentration does not significantly decrease with the decrease in the oxygen concentration of the inside air due to the gas supply operation performed continuously after the introduction of carbon dioxide. The plants in the container can be kept fresh even if it is important for the plants to keep the carbon dioxide concentration high rather than to keep the low oxygen concentration low.

According to the second aspect of the disclosure, if the carbon dioxide concentration of the inside air is lower than the onset concentration at the onset of the carbon dioxide priority control, the gas supply operation is not performed until the carbon dioxide concentration of the inside air reaches the onset concentration through the breathing of the plants (15). Performing the gas supply operation after the carbon dioxide concentration has reached the onset concentration makes it possible to quickly bring the carbon dioxide concentration of the inside air to the target carbon dioxide concentration after the onset of the carbon dioxide priority control. Thus, according to the above-described control, the carbon dioxide concentration of the inside air can be kept around the target carbon dioxide concentration more quickly than the case where the gas supply operation is performed just after the onset of the carbon dioxide priority control. Therefore, the composition of the inside air can be quickly controlled to be a suitable one for keeping the freshness of the plants, which require the carbon dioxide concentration to be kept high.

According to the third aspect of the disclosure, the controller (55) selectively performs the oxygen priority control and the carbon dioxide priority control. In the oxygen priority control, the gas supply operation is performed to lower the oxygen concentration of the inside air, irrespective of the carbon dioxide concentration of the inside air, when the oxygen concentration of the inside air is equal to or higher than the ceiling concentration higher than the target oxygen concentration. In the carbon dioxide priority control, the gas supply operation is controlled in accordance with the carbon dioxide concentration of the inside air to lower the oxygen concentration of the inside air while keeping the carbon dioxide concentration of the inside air around the target carbon dioxide concentration. In this configuration, for example, the oxygen priority control can be performed if the container is loaded with plants for which it is important to keep the oxygen concentration of the inside air low rather than to control the carbon dioxide concentration to be the target carbon dioxide concentration, and the carbon dioxide priority control can be performed if the container is loaded with plants for which it is important to keep the carbon dioxide concentration high rather than to keep the oxygen concentration low. This can keep the freshness of a variety of plants.

According to the fourth aspect of the disclosure, if the oxygen concentration of the inside air is equal to or higher than the ceiling concentration higher than the target oxygen concentration, and therefore needs to be lowered, the controller (55) performs a predetermined priority determination of determining which of the oxygen priority control or the carbon dioxide priority control is performed, and then performs the selected control. This can eliminate the need for a worker to select the oxygen priority control or the carbon dioxide priority control by himself or herself. The control to be performed can be automatically selected through the priority determination by the controller (55), and can be automatically performed. Thus, inappropriate control due to mishandling by the worker would not occur. This can keep the freshness of the plants (15) with improved reliability.

According to the fifth aspect of the disclosure, if the target carbon dioxide concentration is higher than the predetermined value, the controller (55) estimates that priority should be given to, not the lowering of the oxygen concentration of the inside air, but the keeping of the carbon dioxide concentration of the inside air around the target carbon dioxide concentration, and thus, determines in the priority determination to perform the carbon dioxide priority control. Thus, the priority determination can be made only in accordance with the target carbon dioxide concentration without measuring the carbon dioxide concentration of the inside air.

According to the sixth aspect of the disclosure, if the sum of the oxygen concentration and carbon dioxide concentration of the inside air is higher than the predetermined reference concentration which is equal to or higher than 21%, the controller (55) estimates that carbon dioxide has been introduced into the storage (11), and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control. Thus, the priority determination can be easily made only through measurement and calculation of the oxygen concentration and carbon dioxide concentration of the inside air.

According to the seventh aspect of the disclosure, if the carbon dioxide concentration of the inside air has increased by an amount equal to or more than the amount of carbon dioxide increased through the breathing of the plants (15) in a predetermined period, the controller (55) estimates that carbon dioxide has been introduced into the storage (11), and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control. Thus, the priority determination can be easily made only through measurement of the carbon dioxide concentration of the inside air and calculation of the amount increased.

According to the eighth aspect of the disclosure, if the power of the inside air control system is turned on within one day of the turning of the power of the inside air control system from on to off and the carbon dioxide concentration of the inside air has increased by a value equal to or higher than a predetermined value as compared to the carbon dioxide concentration of the inside air just before the power of the inside air control system was turned off, the controller (55) estimates that carbon dioxide has been introduced into the storage (11) while the power of the inside air control system is off, and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control. Thus, the priority determination can be easily made only through measurement of the carbon dioxide concentration of the inside air and calculation of the amount increased.

According to the ninth aspect of the disclosure, having determined to perform the carbon dioxide priority control through the priority determination, the controller (55) sets the carbon dioxide priority flag active. If the carbon dioxide priority flag is active when the power of the inside air control system is turned from off to on, the controller (55) estimates in the priority determination that the carbon dioxide priority control needs to be continued, and continues the carbon dioxide priority control. Therefore, even in a case where the power of the inside air control system is unintentionally turned off even if the carbon dioxide priority control is being performed in accordance with a determination to perform the carbon dioxide priority control, no determination is made in the priority determination because the carbon dioxide priority flag is active, and the carbon dioxide priority control can be easily continued.

According to the tenth aspect of the disclosure, a container refrigeration apparatus including the inside air control system (60) capable of lowering the oxygen concentration of the inside air, while keeping the carbon dioxide concentration of the inside air at the target carbon dioxide concentration.

DESCRIPTION OF EMBODIMENTS

Embodiments of the present invention will be described in detail with reference to the drawings. Note that the following description of embodiments is merely an example in nature, and is not intended to limit the scope, applications, or use of the present invention.

<<Embodiment of Invention>>

Figure 1:
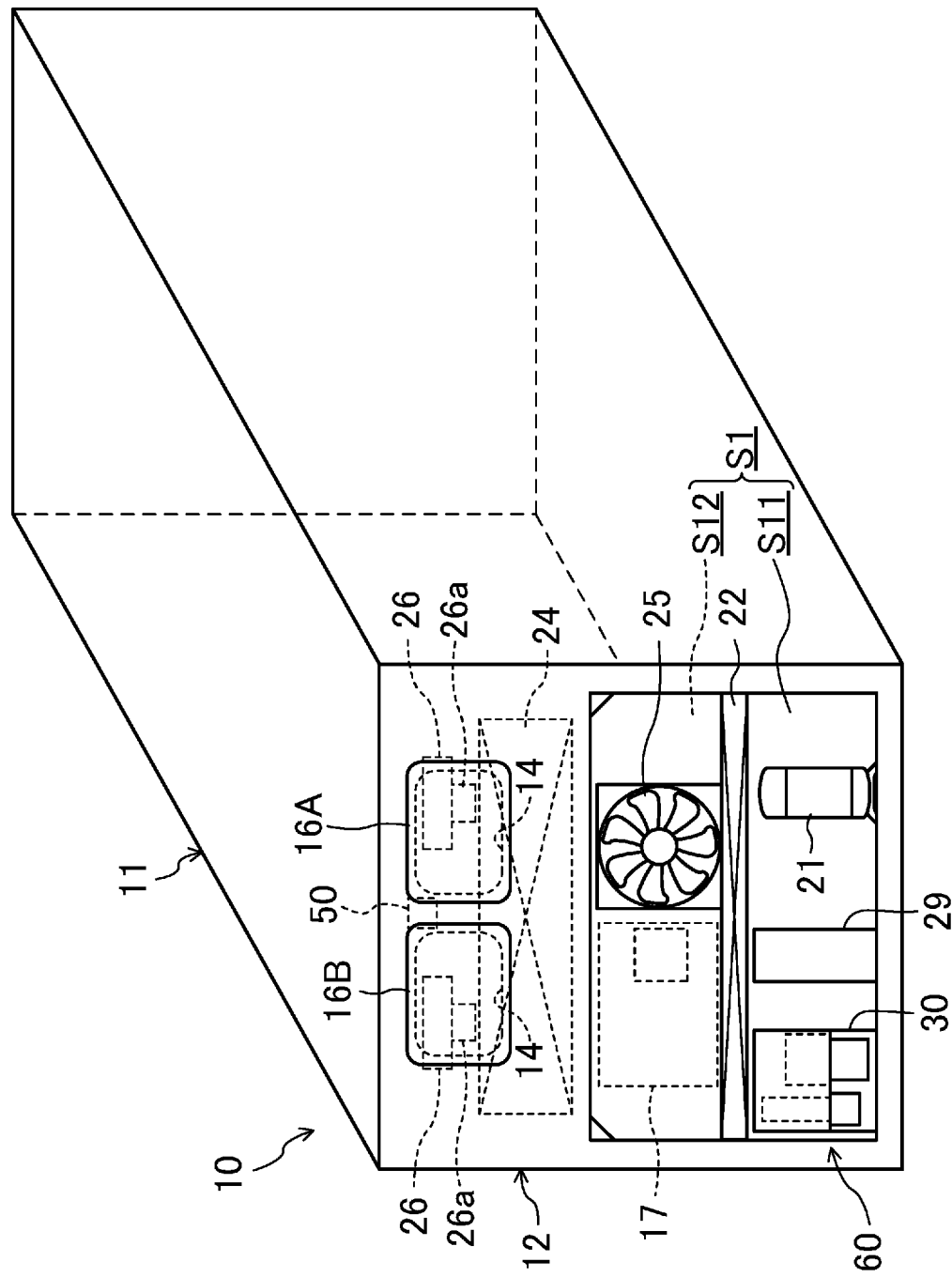
FIG. 1 is a perspective view illustrating a container refrigeration apparatus of an embodiment as viewed from outside a container.
Figure 2:
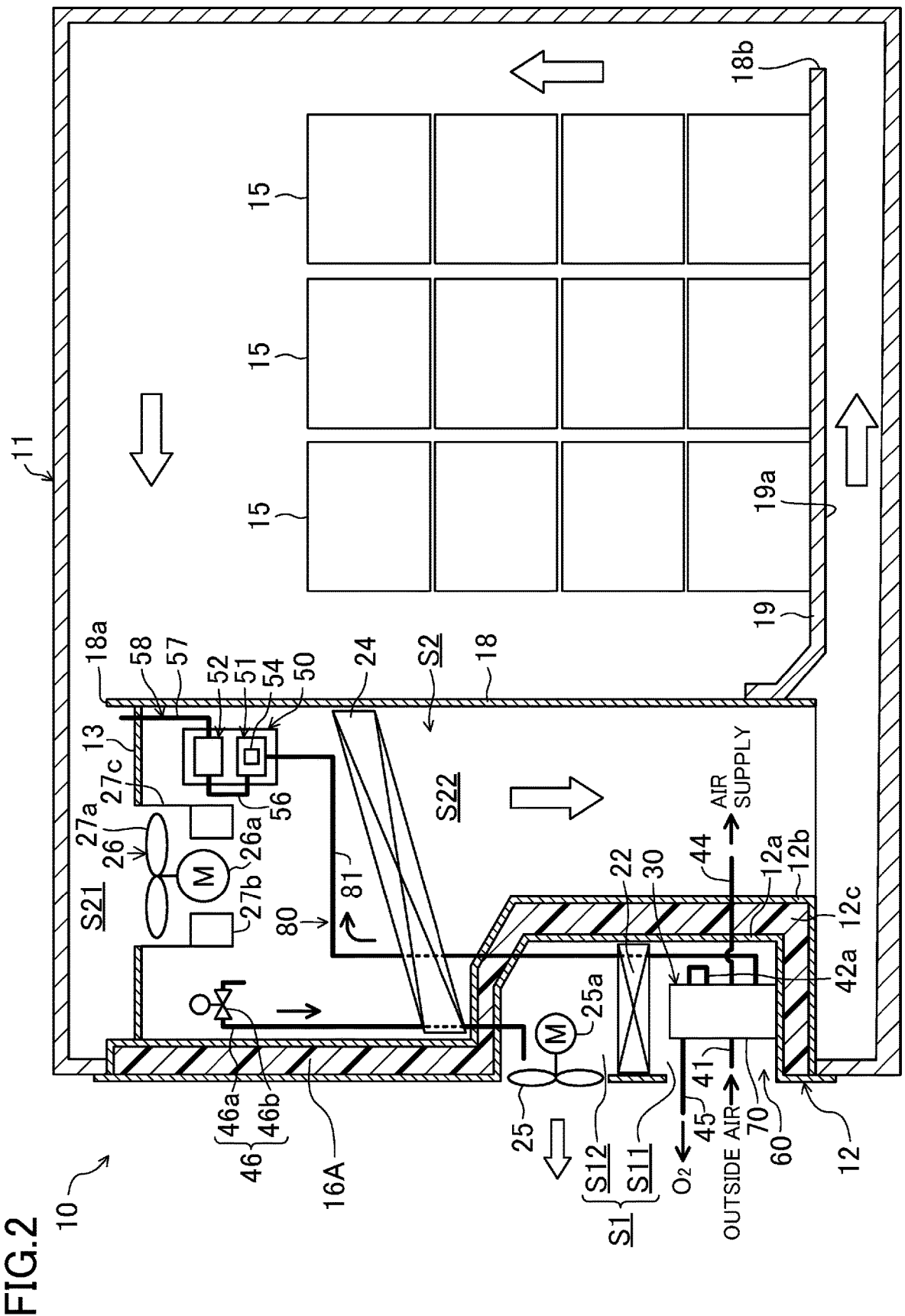
FIG. 2 is a lateral cross-sectional view illustrating a general configuration of the container refrigeration apparatus of the embodiment.

As shown in FIGS. 1 and 2, a container refrigeration apparatus (10) is provided for a container (storage) (11) for use in, e.g., marine transportation, and cools the air in the container (11). Boxed plants (15) are stored in the container (11). The plants (15) breathe by absorbing oxygen ($O_2$) in the air and releasing carbon dioxide ($CO_2$) into the air. Examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere (CA) system (inside air control system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of an aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b) and (12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) divides the internal storage space (S2) horizontally such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the container (11) is provided at an end of the floorboard (19) opposite from the open end of the container (11) (on the right side in FIG. 2).

<Configuration and Arrangement of Refrigerant Circuit and Other Components>

Figure 3:
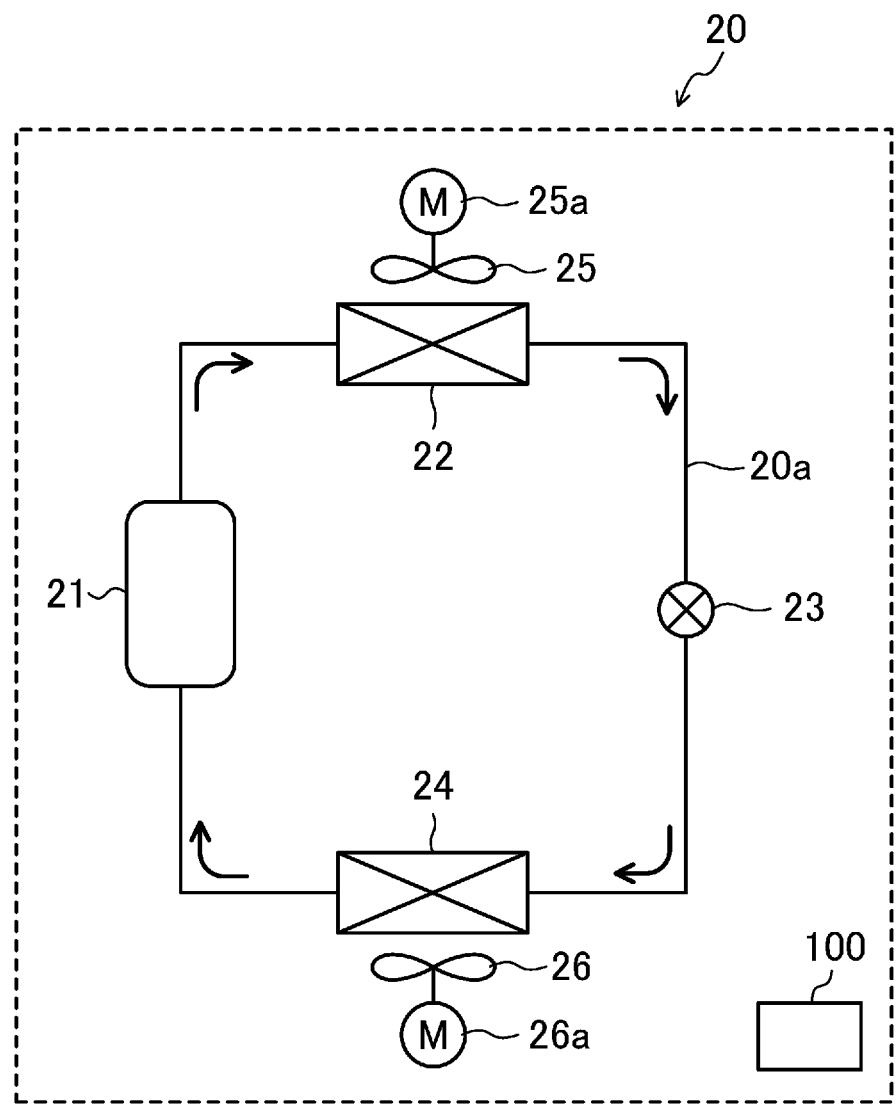
FIG. 3 is a piping diagram illustrating a configuration of a refrigerant circuit of the container refrigeration apparatus of the embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven in rotation by an external fan motor (25a), guides the air in the exterior space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent to the condenser (22) by the external fan (25). In this embodiment, the external fan (25) is comprised of a propeller fan.

Two internal fans (26) are disposed near the evaporator (24). The internal fans (26) are driven in rotation by internal fan motors (26a), and draw the air in the container (11) through a suction port (18a) and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 2, each of the internal fans (26) includes a propeller fan (rotary vane) (27a), a plurality of stationary vanes (27b), and a fan housing (27c). The propeller fan (27a) is coupled to the internal fan motor (26a), and driven in rotation by the internal fan motor (26a) about a rotation axis to blow the air in an axial direction. The plurality of stationary vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electrical component box (17) are disposed in the second space (S12). The first space (S11) is open toward the exterior space of the container (11). A plate member is arranged to close the second space (S12) from the exterior space of the container such that only a blowout port of the external fan (25) is open toward the exterior space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12) (see FIG. 1).

<CA System>

Figure 4:
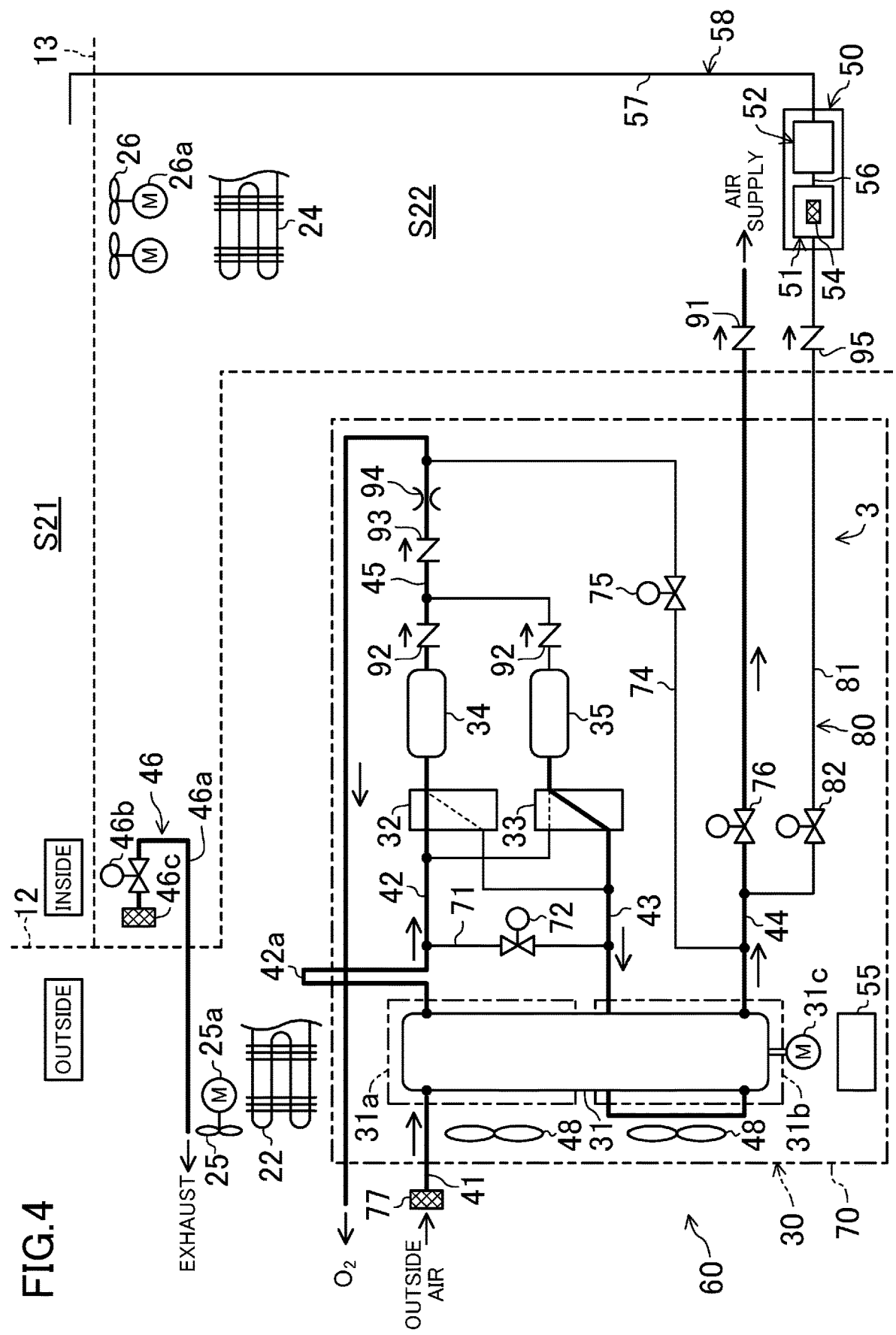
FIG. 4 is a piping diagram illustrating a configuration of a CA system of the embodiment, together with the flow of air during a first operation.
Figure 5:
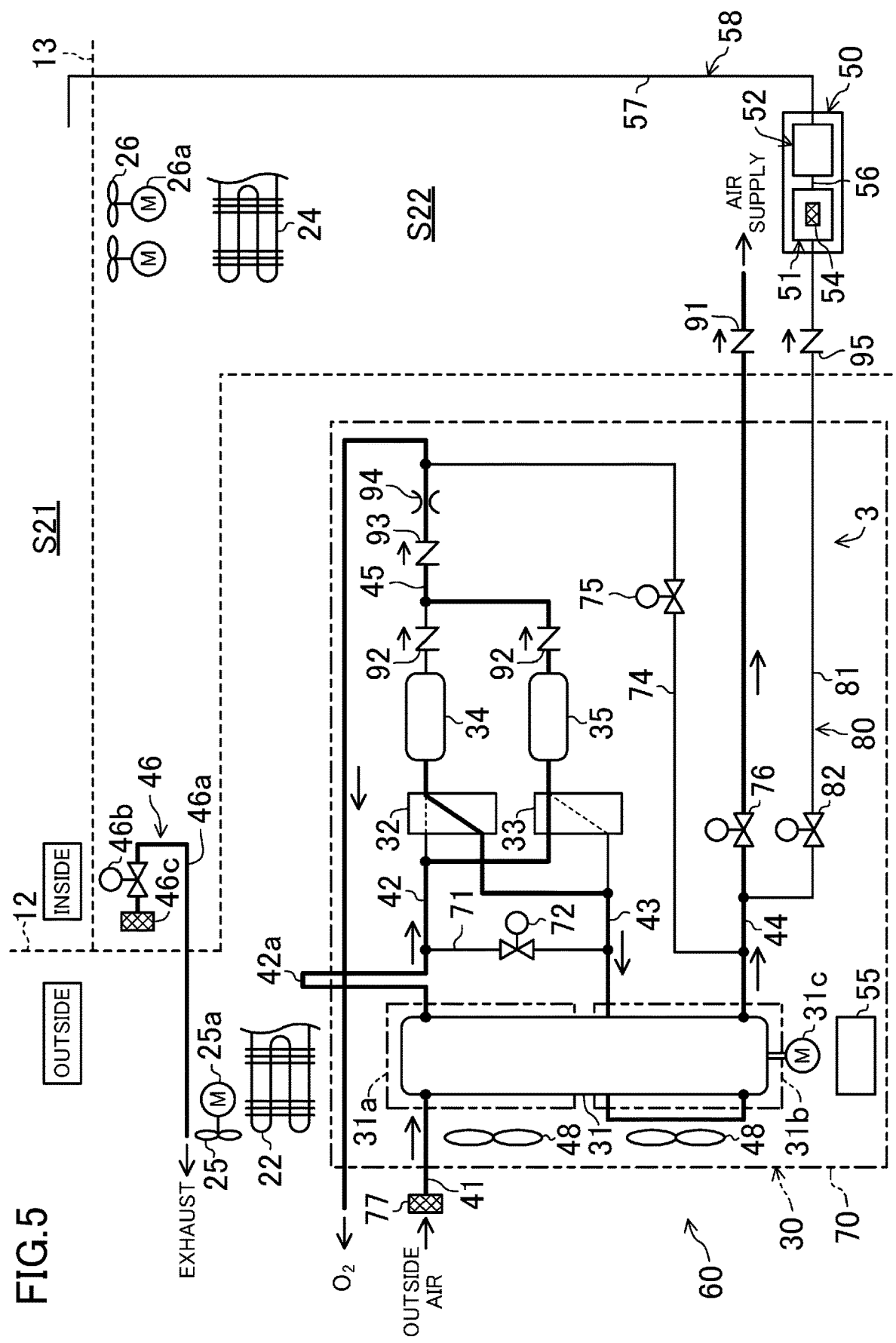
FIG. 5 is a piping diagram illustrating a configuration of the CA system of the embodiment, together with the flow of air during a second operation.
Figure 6:
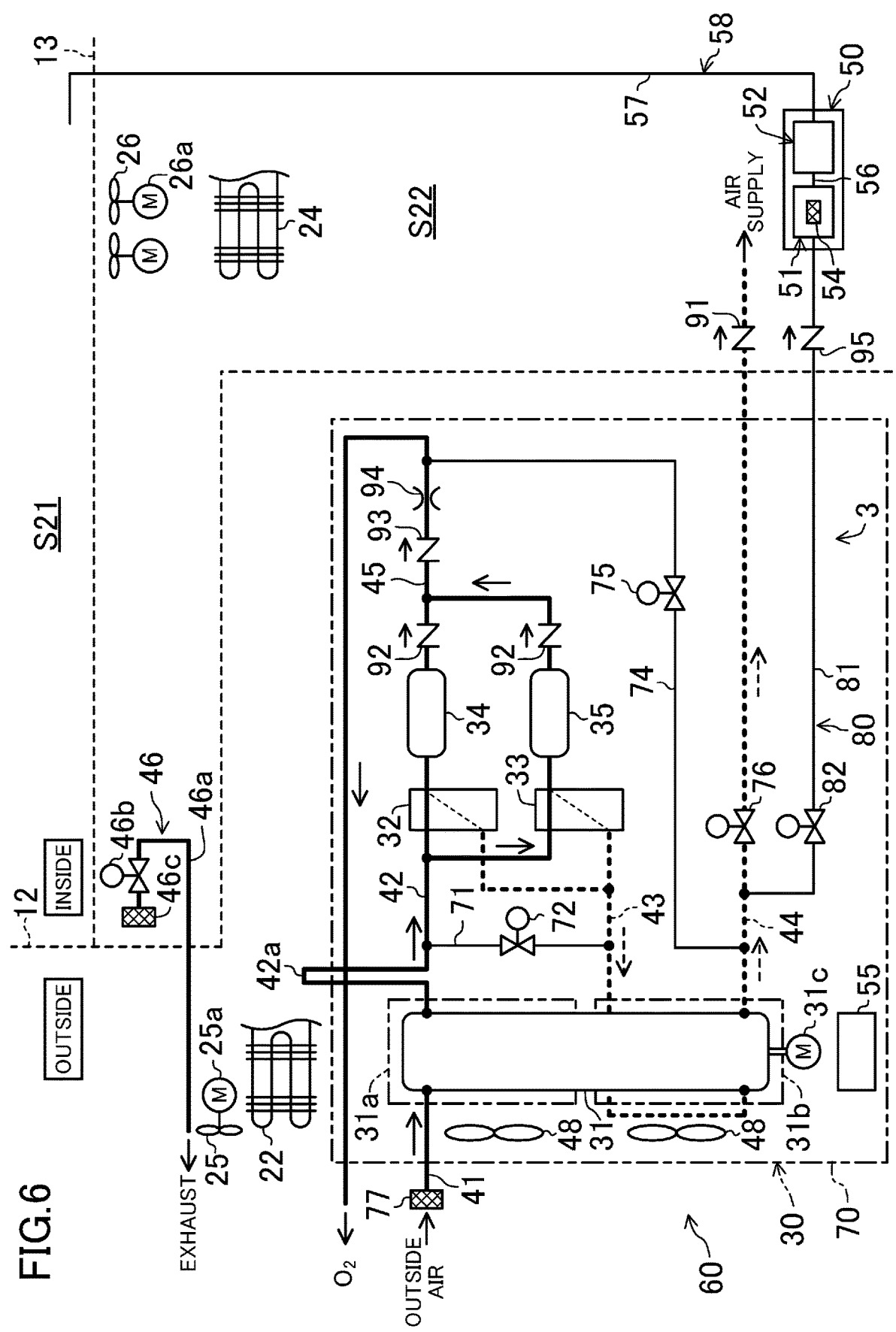
FIG. 6 is a piping diagram illustrating a configuration of the CA system of the embodiment, together with the flow of air during a pressure equalization operation.

As shown in FIGS. 4 to 6, the CA system (60) includes a gas supply device (30), an exhaust portion (46), a sensor unit (50), and a controller (55), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) produces nitrogen-enriched air with a low oxygen concentration to be supplied into the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting together an air pump (31), first and second directional control valves (32) and (33), and first and second adsorption columns (34) and (35) each provided with an adsorbent for adsorbing a nitrogen component in the air, and a unit case (70) housing these components of the air circuit (3).

(Air Pump)

The air pump (31) is provided in the unit case (70), and includes a first pump mechanism (a pressurizing portion) (31a) and a second pump mechanism (a depressurizing portion) (31b), each of which sucks and compresses the air and discharges compressed air. The first and second pump mechanisms (31a) and (31b) are connected to a driving shaft of a motor (31c), and are driven in rotation by the motor (31c) to suck and compress the air, and discharge the compressed air.

One end of an outside air passage (41) arranged so as to pass through the unit case (70) from the interior to exterior of the unit case (70) is connected to the inlet of the first pump mechanism (31a). An air-permeable, waterproof membrane filter (77) is provided at the other end of the outside air passage (41). The outside air passage (41) is made of a flexible tube. Although not shown in the drawings, the other end of the outside air passage (41) where the membrane filter (77) is provided is arranged in the second space (S12) of the external storage space (S1) above the condenser (22). Due to this configuration, the first pump mechanism (31a) sucks and compresses the outside air from which moisture has been removed while flowing from the outside to inside of the unit case (70) through the membrane filter (77) provided at the other end of the outside air passage (41).

On the other hand, an outlet of the first pump mechanism (31a) is connected to one end of a compression passage (42). The other end (downstream end) of the compression passage (42) is divided into two branches, which are connected to the first directional control valve (32) and the second directional control valve (33), respectively. The compression passage (42) is mostly made of a resin tube, and a portion thereof is configured as a cooling portion (42a) located outside the unit case (70). In this embodiment, the cooling portion (42a) is connected to some midpoint of the resin tube, and is made of a copper pipe arranged in the external storage space (S1). Due to this configuration, the air compressed by the first pump mechanism (31a) and flowing through the compression passage (42) dissipates heat to the outside air in the external storage space (S1) where the cooling portion (42a) is disposed, and is cooled, while passing through the cooling portion (42a) made of the copper pipe.

An inlet of the second pump mechanism (31b) is connected to one end of a decompression passage (43). The other end (upstream end) of the decompression passage (43) is divided into two branches, which are connected to the first and second directional control valves (32) and (33), respectively. An outlet of the second pump mechanism (31b) is connected to one end of a supply passage (44). The other end of the supply passage (44) opens in the secondary space (S22) on the blowout side of the internal fans (26) in the internal storage space (S2) of the container (11). The supply passage (44) is provided with a check valve (91) at the other end portion thereof. The check valve (91) allows the air to flow only from one end to the other end of the supply passage (44) and prevents backflow of the air.

In this embodiment, the compression passage (42) and the decompression passage (43) are connected via a bypass passage (71). The bypass passage (71) is provided with a bypass on-off valve (72), an opening/closing operation of which is controlled by the controller (55).

The first and second pump mechanisms (31a) and (31b) of the air pump (31) are configured as oil-free pumps without lubricant oil. Two blower fans (48) are disposed on the side of the air pump (31) to cool the air pump (31) by blowing air toward the air pump (31).

(Directional Control Valve)

The first and second directional control valves (32) and (33) are provided in the air circuit (3) between the air pump (31) and the first and second absorption columns (34) and (35), and switches the connection between the air pump (31) and the first and second absorption columns (34) and (35) among three connection states (first to third connection states) which will be described later. The controller (55) controls the switching.

Specifically, the first directional control valve (32) is connected to the compression passage (42) connected to the outlet of the first pump mechanism (31a), the decompression passage (43) connected to the inlet of the second pump mechanism (31b), and one end portion of the first adsorption column (34) (functioning as an inlet during pressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a) (the state shown in FIG. 5).

The second directional control valve (33) is connected to the compression passage (42) connected to the outlet of the first pump mechanism (31a), the decompression passage (43) connected to the inlet of the second pump mechanism (31b), and one end portion of the second adsorption column (35). The second directional control valve (33) switches between a first state where the second adsorption column (35) is allowed to communicate with the inlet of the second pump mechanism (31b) to be blocked from the outlet of the first pump mechanism (31a) (the state shown in FIG. 4), and a second state where the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to be the first state, the air circuit (3) is switched to a first connection state where the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

If the first and second directional control valves (32) and (33) are set to be the second state, the air circuit (3) is switched to a second connection state where the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

If the first directional control valve (32) is set to be the first state and the second directional control valve (33) is set to be the second state, the air circuit (3) is switched to the third connection state where the outlet of the first pump mechanism (31a) is connected to the first adsorption column (34), and the outlet of the first pump mechanism (31a) is connected to the second adsorption column (35) (see FIG. 6). In this state, both of the first and second adsorption columns (34) and (35) are connected to the outlet of the first pump mechanism (31a), and compressed outside air is supplied from the first pump mechanism (31a) to both of the first and second adsorption columns (34) and (35). In this state, the adsorption operation is performed on both of the first and second adsorption columns (34) and (35).

(Adsorption Column)

The first and second adsorption columns (34) and (35) are configured as cylindrical members filled with an adsorbent. The adsorbent that fills the first and second adsorption columns (34) and (35) adsorbs a nitrogen component in a state where the adsorption columns (34, 35) are pressurized, and desorbs the nitrogen component in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air can be adsorbed using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with the nitrogen component as a result of the desorption operation. Consequently, nitrogen-enriched air including moisture is supplied into the container (11), thus increasing the humidity in the container (11). Furthermore, the adsorbent is regenerated, which can extend the adsorbent's life.

In this configuration, if the air pump (31) supplies the compressed outside air to the first and second adsorption columns (34) and (35) to pressurize these columns (34) and (35), the nitrogen component in the outside air is adsorbed onto the adsorbent. This produces oxygen-enriched air that has had its nitrogen concentration lowered and oxygen concentration increased by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces nitrogen-enriched air that has had its nitrogen concentration increased and oxygen concentration lowered by including more nitrogen component than the outside air does. In this embodiment, the nitrogen-enriched air of 92% nitrogen and 8% oxygen, for example, is produced.

The respective other ends of the first and second adsorption columns (34) and (35) (functioning as outlets during pressurization) are connected to one end of an oxygen discharge passage (45) through which the oxygen-enriched air that has been produced in the first and second adsorption columns (34) and (35) from the compressed outside air supplied by the first pump mechanism (31a) is guided toward the outside of the container (11). The one end of the oxygen discharge passage (45) is divided into two branches, which are connected to the other ends of the first and second adsorption columns (34) and (35), respectively. The other end of the oxygen discharge passage (45) opens outside the gas supply device (30), i.e., outside the container (11). The branches of the oxygen discharge passage (45) are connected to the other ends of the first and second adsorption columns (34) and (35), respectively. Each of the junction portions is provided with a check valve (92) which prevents backflow of the air from the oxygen discharge passage (45) toward the first and second adsorption columns (34) and (35).

A check valve (93) and an orifice (94) are arranged at some midpoints of the oxygen discharge passage (45) so as to be sequentially arranged from one end to the other end of the oxygen discharge passage (45). The check valve (93) prevents backflow of the nitrogen-enriched air from an exhaust connection passage (74), which will be described later, toward the first and second adsorption columns (34) and (35). The orifice (94) depressurizes the oxygen-enriched air which has flowed out of the first and second adsorption columns (34) and (35) before the oxygen-enriched air is exhausted from the container.

(Supply-Discharge Switching Mechanism)

The air circuit (3) is provided with a supply-exhaust switching mechanism which switches between a gas supply operation, described later, of supplying the produced nitrogen-enriched air into the container (11), and a gas exhaust operation of exhausting the produced nitrogen-enriched air to the outside of the container (11). The supply-discharge switching mechanism includes an exhaust connection passage (74), an exhaust on-off valve (75), and a supply on-off valve (76).

The exhaust connection passage (74) has one end connected to the supply passage (44), and the other end connected to the oxygen discharge passage (45). The other end of the exhaust connection passage (74) is connected to the oxygen discharge passage (45) so as to be located further toward the outside of the container than the orifice (94).

The exhaust on-off valve (75) is provided for the exhaust connection passage (74). The exhaust on-off valve (75) is provided at a midpoint of the exhaust connection passage (74), and is comprised of a solenoid valve which is switched between an open state where the flow of the nitrogen-enriched air from the supply passage (44) is allowed, and a closed state where the flow of the nitrogen-enriched air is blocked. The controller (55) controls an opening/closing operation of the exhaust on-off valve (75).

The supply on-off valve (76) is provided at the supply passage (44) so as to be located further toward the other end (toward the inside of the container) than the junction where the exhaust connection passage (74) is connected. The supply on-off valve (76), which is located further toward the inside of the container than the junction between the supply passage (44) and the exhaust connection passage (74), is comprised of a solenoid valve which is switched between an open state where the flow of the nitrogen-enriched air toward the inside of the container is allowed, and a closed state where the flow of the nitrogen-enriched air toward the inside of the container is blocked. The controller (55) controls an opening/closing operation of the exhaust on-off valve (76).

(Measurement Unit)

The air circuit (3) is provided with a measurement unit (80) for performing a supply air measurement operation to measure the concentration of the produced nitrogen-enriched air using an oxygen sensor (51) of a sensor unit (50), which will be described later, provided in the container (11). The measurement unit (80) includes a branch pipe (a measurement passage) (81) and a measurement on-off valve (82), and allows part of the nitrogen-enriched air flowing through the supply passage (44) to be diverged toward the oxygen sensor (51).

Specifically, the branch pipe (81) has an end connected to the supply passage (44) and the other end connected to the oxygen sensor (51). In this embodiment, the branch pipe (81) is branched from the supply passage (44) in the unit case (70) and extends from the interior to exterior of the unit case (70). The branch pipe (81) is provided with a check valve (95) at the other end portion thereof. The check valve (95) allows the air to flow only from one end to the other end of the branch pipe (81) and prevents backflow of the air.

The measurement on-off valve (82) is provided for the branch pipe (81) in the unit case. The measurement on-off valve (82) is comprised of a solenoid valve which switches between an open state where the flow of the nitrogen-enriched air in the branch pipe (81) is allowed, and a closed state where the flow of the nitrogen-enriched air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

—Operation of Gas Supply Device—

(Gas Production Operation)

The gas supply device (30) alternately repeats a first operation (see FIG. 4) in which the first adsorption column (34) is pressurized and the second adsorption column (35) is depressurized simultaneously, and a second operation (see FIG. 5) in which the first adsorption column (34) is depressurized and the second adsorption column (35) is pressurized simultaneously every predetermined time (e.g., 14.5 seconds) so as to produce the nitrogen-enriched air and the oxygen-enriched air. In this embodiment, a pressure equalization operation (see FIG. 6) in which both of the first and second adsorption columns (34) and (35) are pressurized is performed for a predetermined time (e.g., 1.5 seconds) between the first and second operations. The controller (55) controls the first and second directional control valves (32) and (33) to perform the switching among these operations.

«First Operation»

During, the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a). In the first connection state, the outside air compressed by the first pump mechanism (31a) is supplied to the first adsorption column (34), whereas the second pump mechanism (31b) sucks from the second adsorption column (35) the nitrogen-enriched air having a higher nitrogen concentration and a lower oxygen concentration than the outside air.

Specifically, the first pump mechanism (31a) sucks and compresses the outside air through the outside air passage (41). The compressed outside air is discharged into the discharge passage (42). The compressed air discharged into the discharge passage (42) flows through the discharge passage (42) into the cooling portion (42a) provided outside the unit case (70) and in the external storage space (S1). The compressed air is cooled through heat exchange with the outside air while passing through the cooling portion (42a), and is then supplied to the first adsorption column (34).

The cooled compressed air flows into the first adsorption column (34) in this manner. The nitrogen component contained in the compressed air is adsorbed onto the adsorbent. The adsorption performance of the adsorbent improves as the temperature of the adsorbent drops. Thus, cooling the compressed air in advance in the cooling portion (42a) as mentioned above improves the adsorption performance of the adsorbent, compared with the case where the compressed air is not cooled in advance. Thus, during the first operation, the first pump mechanism (31a) supplies the compressed outside air to the first adsorption column (34), in which the adsorbent adsorbs a nitrogen component in the outside air, thereby producing oxygen-enriched air having a lower nitrogen concentration and a higher oxygen concentration than the outside air. The oxygen-enriched air flows from the first adsorption column (34) to the oxygen discharge passage (45).

On the other hand, the second pump mechanism (31b) sucks the air from the second adsorption column (35). Simultaneously, the second pump mechanism (31b) also sucks the nitrogen component that has been adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

«Second Operation»

In the second operation, the controller (55) switches the first and second directional control valves (32) and (33) to the second state shown in FIG. 5. Thus, the air circuit (3) is set to the second connection state where the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b). In the second connection state, the outside air compressed by the first pump mechanism (31a) is supplied to the second adsorption column (35), whereas the second pump mechanism (31b) sucks the nitrogen-enriched air from the first adsorption column (34).

Specifically, the first pump mechanism (31a) sucks and compresses the outside air through the outside air passage (41). The compressed outside air is discharged into the discharge passage (42). The compressed air discharged into the discharge passage (42) flows through the discharge passage (42) into the cooling portion (42a) provided outside the unit case (70) and in the external storage space (S1). The compressed air is cooled through heat exchange with the outside air while passing through the cooling portion (42a), and is then supplied to the second adsorption column (35).

The cooled compressed air flows into the second adsorption column (35) in this manner. The nitrogen component contained in the compressed air is adsorbed onto the adsorbent. In the second operation, too, cooling the compressed air in advance in the cooling portion (42a) improves the adsorption performance of the adsorbent, compared with the case where the compressed air is not cooled in advance. Thus, during the second operation, the first pump mechanism (31a) supplies the compressed outside air to the second adsorption column (35), in which the adsorbent adsorbs the nitrogen component in the outside air, thereby producing oxygen-enriched air having a lower nitrogen concentration and a higher oxygen concentration than the outside air. The oxygen-enriched air flows from the second adsorption column (35) to the oxygen discharge passage (45).

On the other hand, the second pump mechanism (31b) sucks the air from the first adsorption column (34). Simultaneously, the second pump mechanism (31b) also sucks the nitrogen component that has been adsorbed onto the adsorbent in the first adsorption column (34) together with the air, thereby allowing the adsorbent to desorb the nitrogen component. Thus, during the second operation, the second pump mechanism (31b) sucks the air out of the first adsorption column (34) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

«Pressure Equalization Operation»

As illustrated in FIG. 6, in the pressure equalization operation, the controller (55) switches the first directional control valve (32) to the first state, and the second directional control valve (33) to the second state. Thus, the air circuit (3) is set to the third connection state where both of the first and second adsorption columns (34) and (35) communicate with the outlet of the first pump mechanism (31a) and are blocked from the inlet of the second pump mechanism (31b). In the third connection state, the outside air compressed by the first pump mechanism (31a) is supplied to both of the first and second adsorption columns (34) and (35), and the second pump mechanism (31b) sucks the nitrogen-enriched air remaining in the suction passage (43).

Specifically, the first pump mechanism (31a) sucks and compresses the outside air through the outside air passage (41). The compressed outside air is discharged into the discharge passage (42). The compressed air discharged into the discharge passage (42) flows through the discharge passage (42) into the cooling portion (42a) provided outside the unit case (70) and in the external storage space (S1). The compressed air is cooled through heat exchange with the outside air while passing through the cooling portion (42a), and is then supplied to both of the first and second adsorption columns (34) and (35).

In the first and second adsorption columns (34) and (35), the nitrogen component contained in the compressed air which has flowed into the columns (34) and (35) is adsorbed onto the adsorbent, and the oxygen-enriched air is produced. The oxygen-enriched air flows from the first and second adsorption columns (34) and (35) to the oxygen discharge passage (45).

On the other hand, the second pump mechanism (31b) is blocked from the first and second adsorption columns (34) and (35). Thus, in the pressure equalization operation, the nitrogen-enriched air is not produced any more in the first and second adsorption columns (34) and (35). The second pump mechanism (31b) sucks and compresses the nitrogen-enriched air remaining in the suction passage (43), and discharges the compressed nitrogen-enriched air into the supply passage (44).

As mentioned above, in the first operation, the first adsorption column (34) is pressurized by the first pump mechanism (31a) to perform the adsorption operation, whereas the second adsorption column (35) is depressurized by the second pump mechanism (31b) to perform the desorption operation. On the other hand, in the second operation, the second adsorption column (35) is pressurized by the first pump mechanism (31a) to perform the adsorption operation, whereas the first adsorption column (34) is depressurized by the second pump mechanism (31b) to perform the desorption operation. Thus, when the first operation is switched to the second operation or the second operation is switched to the first operation without the pressure equalization operation performed between the first and second operations, the pressure in the adsorption column where the desorption operation has been performed before the switching is remarkably low right after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). In this configuration, the internal pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and performing the desorption operation before the switching. Thus, the adsorption operation is performed immediately after the connection with the first pump mechanism (31a).

In this way, the gas supply device (30) alternately repeats the first operation (see FIG. 4) and the second operation (see FIG. 5), with the pressure equalization operation (see FIG. 6) performed during intervals between the first and second operations, thereby producing nitrogen-enriched air having a higher nitrogen concentration and lower oxygen concentration than the outside air (gas production operation). In this embodiment, the nitrogen-enriched air having a mean nitrogen concentration of 92% (i.e., a mean value of the nitrogen concentration of the nitrogen-enriched air supplied into the container in each of the first and second operations) and a mean oxygen concentration of 8% (i.e., a mean value of the oxygen concentration of the nitrogen-enriched air supplied into the container in each of the first and second operations) is produced.

(Gas Supply Operation/Gas Discharge Operation)

The supply-discharge switching mechanism switches the gas supply device (30) between a gas supply operation in which the nitrogen-enriched air produced through a gas production operation is supplied into the container (11), and a gas discharge operation in which the nitrogen-enriched air produced through the gas production operation is not supplied into, but discharged to the outside of, the container (11) for a predetermined time since the start of the desorption operation.

«Gas Supply Operation»

During the gas supply operation, as shown in FIGS. 4 to 6, the controller (55) closes the exhaust on-off valve (75), and opens the supply on-off valve (76). As a result, the nitrogen-enriched air produced alternately in the first and second adsorption columns (34) and (35) is supplied into the container (11) through the supply passage (44), and the oxygen-enriched air is discharged to the outside of the container through the oxygen discharge passage (45).

«Gas Discharge Operation»

Although not shown, during the gas discharge operation, the controller (55) opens the exhaust on-off valve (75), and closes the supply on-off valve (76). As a result, the nitrogen-enriched air produced alternately in the first and second adsorption columns (34) and (35) and discharged toward the supply passage (44) is not allowed to flow further toward the inside of the container than the supply on-off valve (76) in the supply passage (44), and flows into the exhaust connection passage (74). The nitrogen-enriched air that has flowed into the exhaust connection passage (74) flows into the oxygen discharge passage (45), and is discharged to the outside of the container together with the oxygen-enriched air flowing through the oxygen discharge passage (45).

[Exhaust Portion]

—Configuration of Exhaust Portion—

As shown in FIG. 2, the exhaust portion (46) includes an exhaust passage (46a) connecting the internal storage space (S2) and the exterior space of the container together, an exhaust valve (46b) connected to the exhaust passage (46a), and a membrane filter (46c) provided at an inlet end (an end located inside the container) of the exhaust passage (46a). The exhaust passage (46a) passes through the casing (12) from the interior to exterior of the casing (12). The exhaust valve (46b) is provided adjacent to an internal end of the exhaust passage (46a), and is comprised of a solenoid valve which is switched between an open state where the flow of the air in the exhaust passage (46a) is allowed, and a closed state where the flow of the air in the exhaust passage (46a) is blocked. The controller (55) controls an opening/closing operation of the exhaust valve (46b).

—Operation of Exhaust Portion—

When the internal fans (26) are rotating, an exhaust operation is performed. That is, the controller (55) opens the exhaust valve (46b) to discharge the air (inside air) in the internal storage space (S2) communicating with the interior of the container to the outside of the container.

Specifically, when the internal fans (26) are rotating, the pressure of the secondary space (S22) on the blowout side becomes higher than the pressure of the exterior space of the container (i.e., the atmospheric pressure). Thus, when the exhaust valve (46b) is open, due to the pressure difference between the ends of the exhaust passage (46a) (the pressure difference between the external space of the container and the secondary space (S22)), the air in the internal storage space (S2) communicating with the interior of the container (inside air) is discharged to the outside of the container via the exhaust passage (46a).

[Sensor Unit]

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a membrane filter (54), a connection pipe (56), and an exhaust pipe (57).

The oxygen sensor (51) is comprised of a galvanic-cell sensor. The carbon dioxide sensor (52) is comprised of a non-dispersive infrared (NDIR) sensor. The oxygen sensor (51) is coupled to the branch pipe (81) of the measurement unit (80), and the connection pipe (56) couples the oxygen sensor (51) and the carbon dioxide sensor (52) together. The exhaust pipe (57) has an end coupled to the carbon dioxide sensor (52), and the other end opening near the inlet of the internal fan (26). The oxygen sensor (51) has an inlet through which ambient air is taken, and the membrane filter (54) is provided for the inlet.

In this configuration, the secondary and primary spaces (S22) and (S21) of the internal storage space (S2) communicate with each other via an air passage (58) formed by the membrane filter (54), the oxygen sensor (51), the connection pipe (56), the carbon dioxide sensor (52), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the air sequentially flows from the interior of the container to the oxygen sensor (51) and the carbon dioxide sensor (52), and then the oxygen concentration of the inside air is measured by the oxygen sensor (51), and the carbon dioxide concentration of the inside air is measured by the carbon dioxide sensor (52). During the supply air measurement operation to be described later while the internal fans (26) stop rotating, the nitrogen-enriched air produced in the gas supply device (30) is guided to the oxygen sensor (51) via the branch pipe (81), and the oxygen concentration of this nitrogen-enriched air is measured by the oxygen sensor (51).

[Controller]

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on the results of the measurement by the oxygen sensor (51) and the carbon dioxide sensor (52) so that the oxygen concentration and carbon dioxide concentration of the air in the container (11) are controlled to desired target concentrations (oxygen concentration and carbon dioxide concentration).

Figure 7:
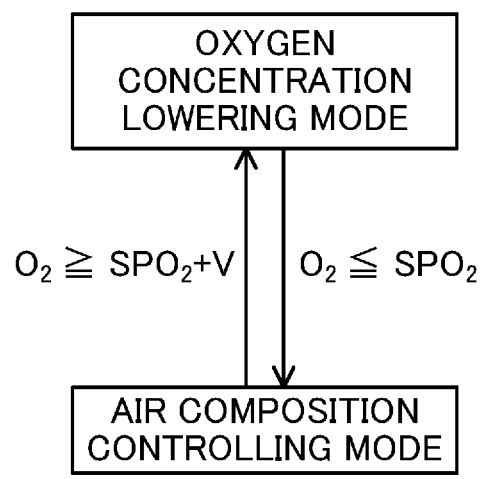
FIG. 7 illustrates how the mode changes during a concentration control operation of the CA system of the embodiment.

As shown in FIG. 7, the controller (55) is configured to perform the concentration control operation in an oxygen concentration lowering mode and an air composition controlling mode. Specifically, the controller (55) starts the concentration control operation in the oxygen concentration lowering mode, and if the oxygen concentration of the air in the container (11) reaches or falls below a target oxygen concentration $SPO_2$, the controller (55) switches the operation mode to the air composition controlling mode. Then, in the air composition controlling mode, if the oxygen concentration of the air in the container (11) reaches or exceeds a ceiling concentration during, which is the sum of the target oxygen concentration $SPO_2$ and a predetermined concentration V (1.0% in this embodiment), the controller (55) finishes the control in the air composition controlling mode and returns to the oxygen concentration lowering mode.

Further, in the oxygen concentration lowering mode, the controller (55) is configured to make a predetermined priority determination of determining which of carbon dioxide priority control or oxygen priority control is performed. In the carbon dioxide priority control, the carbon dioxide concentration of the inside air is controlled in preference to the oxygen concentration, and in the oxygen priority control, the oxygen concentration of the inside air is controlled in preference to the carbon dioxide concentration. The priority determination and the controls will be described in detail later. Having determined to perform the carbon dioxide priority control through the priority determination, the controller (55) sets a carbon dioxide priority flag active (saves "Y"). If the controller (55) has determined to perform the oxygen priority control through the priority determination and a predetermined reset condition is met, the controller (55) sets the carbon dioxide priority flag inactive (saves "N").

In addition, the controller (55) is configured to perform a supply air measurement operation of measuring the oxygen concentration of the nitrogen-enriched air produced by the gas supply device (30) in accordance with a command entered by a user or periodically. The controller (55) controls the operation of the measurement on-off valve (82) so as to perform the supply air measurement operation.

The controller (55) of this embodiment includes a microcomputer which controls various components of the CA system (60) in such a manner as disclosed in this application, a memory or a hard disk which stores control programs that can be executed. Note that the controller (55) is an example of a controller of the CA system (60), and a detailed structure and algorithm of the controller (55) may be comprised of a combination of any kind of hardware and software that can implement the functions of the present invention.

—Operation—

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

<Concentration Control Operation>

In this embodiment, the controller (55) shown in FIG. 4 instructs the CA system (60) to perform a concentration control operation of controlling the composition of the air in the container (11) (oxygen concentration and carbon dioxide concentration) to a desired composition. In the concentration control operation, the controller (55) performs control in the oxygen concentration lowering mode and the air composition controlling mode.

Specifically, the controller (55) starts the concentration control operation in the oxygen concentration lowering mode, and if the oxygen concentration of the air in the container (11) reaches or falls below the target oxygen concentration $SPO_2$ during the oxygen concentration lowering mode, the controller (55) switches the operation mode to the air composition controlling mode. Then, in the air composition controlling mode, if the oxygen concentration of the air in the container (11) reaches or exceeds a certain concentration, which is the sum of the target oxygen concentration $SPO_2$ and a predetermined concentration V (1.0% in this embodiment), the controller (55) finishes the control in the air composition controlling mode and returns to the oxygen concentration lowering mode. The oxygen concentration lowering mode and the air composition controlling mode will be described in detail below.

Irrespective of the mode selected, the controller (55) closes the measurement on-off valve (82), and communicates with the unit controller (100) to rotate the internal fans (26) during the concentration control operation, thereby allowing the inside air to circulate between the inside of the container and the internal storage space (S2). Thus, the inside air is supplied to the oxygen sensor (51) and carbon dioxide sensor (52) in the internal storage space (S2), and then the oxygen concentration and carbon dioxide concentration of the inside air are measured.

[Oxygen Concentration Lowering Mode]

As described above, in the oxygen concentration lowering mode, the controller (55) performs the predetermined priority determination of determining which of carbon dioxide priority control of controlling the carbon dioxide concentration of the inside air in preference to the oxygen concentration, or oxygen priority control of controlling the oxygen concentration of the inside air in preference to the carbon dioxide concentration is performed. The controller (55) executes the control selected through the determination. The priority determination, the oxygen priority control, and the carbon dioxide priority control will be described in detail below.

«Priority Determination»

According to the controller (55), the priority determination at the onset of the concentration control operation when the power of the CA system (60) is turned on and the priority determination during the concentration control operation are performed in different procedures. The procedures will be described in detail below.

(Priority Determination at the Onset of Concentration Control Operation)

Figure 8:
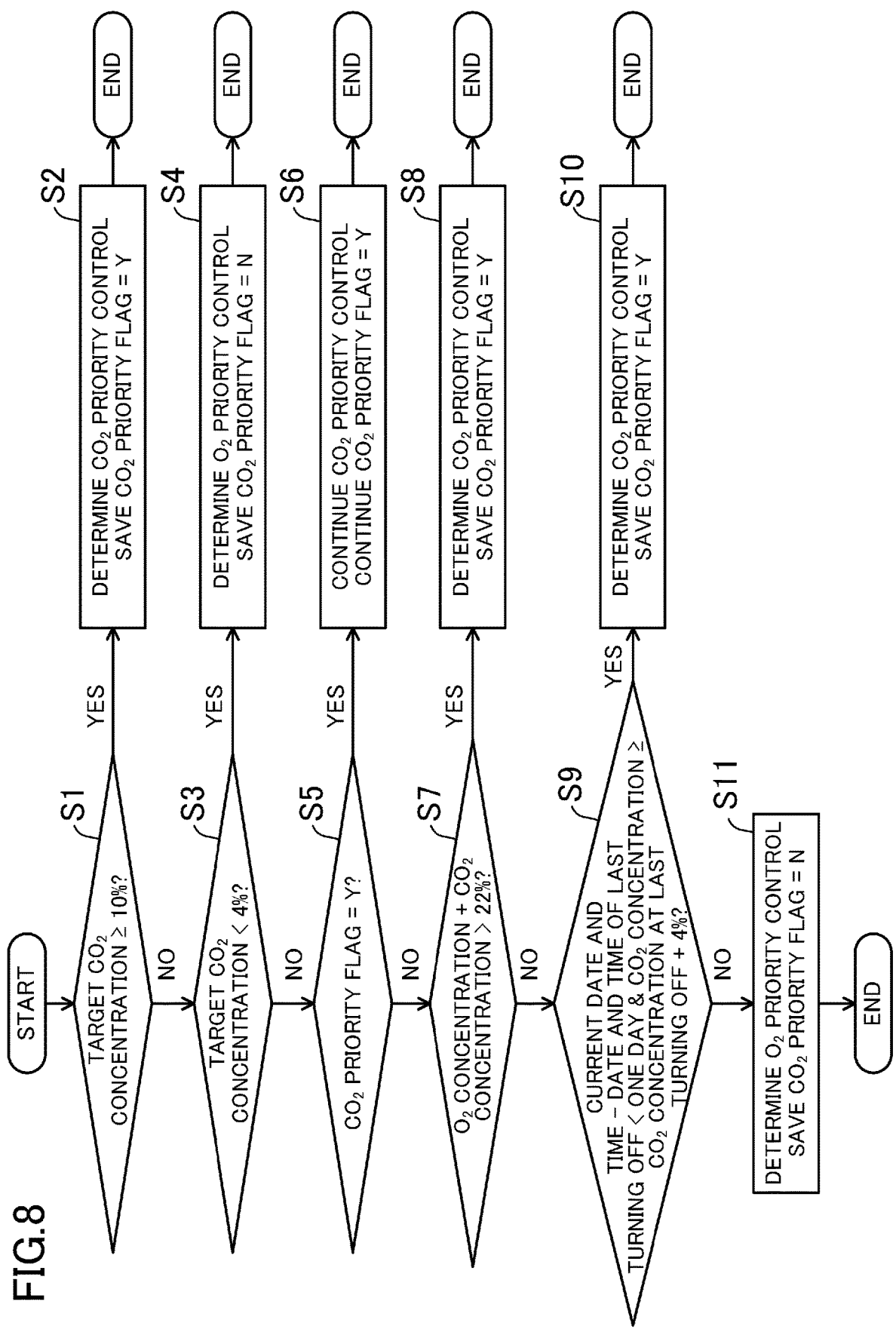
FIG. 8 is a flowchart illustrating how priority determination is made at the onset of the concentration control operation of the CA system of the embodiment.

As shown in FIG. 8, the controller (55) performs the priority determination in the following procedure when the power of the CA system (60) is turned on and the concentration control operation is started.

First, the controller (55) determines whether the target carbon dioxide concentration is equal to or higher than 10% (Step S1). In Step S1, if the target carbon dioxide concentration is equal to or higher than 10%, the procedure proceeds to Step S2, in which the controller (55) determines to perform the carbon dioxide priority control, sets the carbon dioxide priority flag active (saves "Y"), and finishes the determination.

In Step S1, if the target carbon dioxide concentration is lower than 10%, the procedure proceeds to Step S3, in which the controller (55) determines whether the target carbon dioxide concentration is lower than 4% or not. In Step S3, if the target carbon dioxide concentration is lower than 4%, the procedure proceeds to Step S4, in which the controller (55) determines to perform the oxygen priority control, sets the carbon dioxide priority flag inactive (saves "N"), and finishes the determination.

In Step S3, if the target carbon dioxide concentration is equal to or higher than 4%, the procedure proceeds to Step S5, in which the controller (55) determines whether the carbon dioxide priority flag is active or not ("Y" is saved or not). In Step S5, if the carbon dioxide priority flag is active, the procedure proceeds to Step S6, in which the controller (55) determines to perform the carbon dioxide priority control, sets the carbon dioxide priority flag active (saves "Y"), and finishes the determination.

In Step S5, if the carbon dioxide priority flag is inactive, the procedure proceeds to Step S7, in which the controller (55) determines whether the sum of the carbon dioxide concentration and oxygen concentration of the inside air is more than 22% (a predetermined concentration equal to or more than 21%) or not. In Step S7, if the sum of the carbon dioxide concentration and oxygen concentration of the inside air is more than 22%, the procedure proceeds to Step S8, in which the controller (55) determines to perform the carbon dioxide priority control, sets the carbon dioxide priority flag active (saves "Y"), and finishes the determination.

In Step S7, if the sum of the carbon dioxide concentration and oxygen concentration of the inside air is equal to or less than 22%, the procedure proceeds to Step S9, in which the controller (55) determines whether a condition that a period between the last turning off to next turning on of the CA system (60) is less than one day and a condition that the carbon dioxide concentration of the inside air has increased by 4% or more (increased by the amount of carbon dioxide increased through breathing or more) as compared to the carbon dioxide concentration just before the last turning off of the CA system (60) are both satisfied. In Step S9, if the period from the last turning off to next turning on of the CA system (60) is less than one day and the carbon dioxide concentration of the inside air has increased by 4% or more as compared to the carbon dioxide concentration just before the last turning off of the CA system (60), the procedure proceeds to Step S10, in which the controller (55) determines to perform the carbon dioxide priority control, sets the carbon dioxide priority flag active (saves "Y"), and finishes the determination.

In Step S9, if the period from the last turning off to next turning on of the CA system (60) is not less than one day or the carbon dioxide concentration of the inside air has not increased by 4% or more as compared to the carbon dioxide concentration just before the last turning off of the CA system (60), the procedure proceeds to Step S11, in which the controller (55) determines to perform the oxygen priority control, sets the carbon dioxide priority flag inactive (saves "N"), and finishes the determination.

(Priority Determination During Concentration Control Operation)

Figure 9:
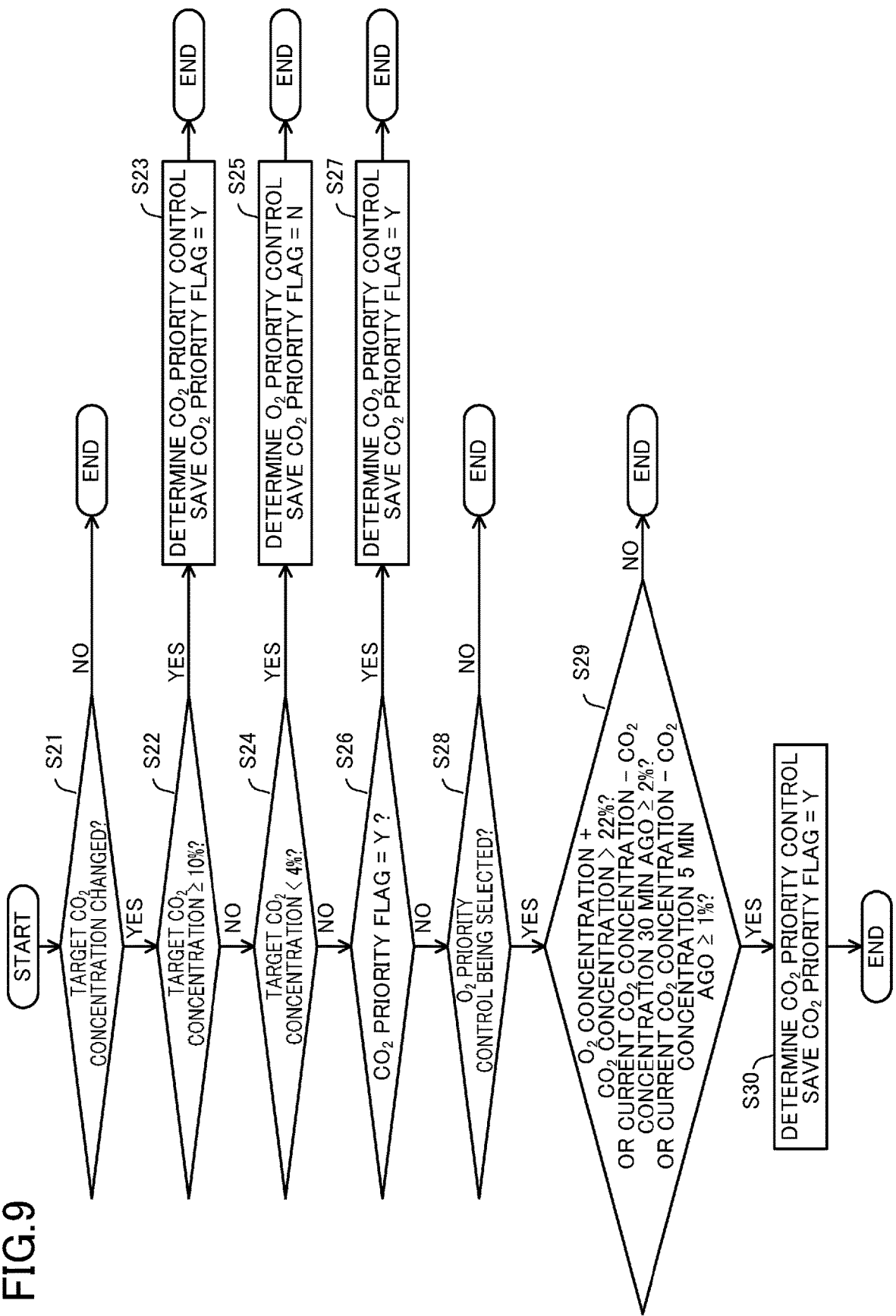
FIG. 9 is a flowchart illustrating how the priority determination is made during the concentration control operation of the CA system of the embodiment.

As shown in FIG. 9, after the priority determination performed when the power of the CA system (60) was turned on has been finished, the controller (55) performs the priority determination in the following procedure during the concentration control operation in the oxygen concentration lowering mode.

First, the controller (55) determines whether the target carbon dioxide concentration has been changed or not (Step S21). If the target carbon dioxide concentration has not been changed in Step S21, the controller (55) finishes the determination. Thus, the currently selected priority control (oxygen priority control or carbon dioxide priority control) is continued.

In Step S21, if the target carbon dioxide concentration has been changed, the procedure proceeds to Step S22, in which the controller (55) determines whether the target carbon dioxide concentration is equal to or higher than 10%. In Step S22, if the target carbon dioxide concentration is equal to or higher than 10%, the procedure proceeds to Step S23, in which the controller (55) determines to perform the carbon dioxide priority control, sets the carbon dioxide priority flag active (saves "Y"), and finishes the determination.

In Step S22, if the target carbon dioxide concentration is lower than 10%, the procedure proceeds to Step S24, in which the controller (55) determines whether the target carbon dioxide concentration is lower than 4% or not. In Step S24, if the target carbon dioxide concentration is lower than 4%, the procedure proceeds to Step S25, in which the controller (55) determines to perform the oxygen priority control, sets the carbon dioxide priority flag inactive (saves "N"), and finishes the determination.

In Step S24, if the target carbon dioxide concentration is not lower than 4%, the procedure proceeds to Step S26, in which the controller (55) determines whether the carbon dioxide priority flag is active or not ("Y" is saved or not). In Step S26, if the carbon dioxide priority flag is active, the procedure proceeds to Step S27, in which the controller (55) determines to perform the carbon dioxide priority control, sets the carbon dioxide priority flag active (saves "Y"), and finishes the determination.

In Step S26, if the carbon dioxide priority flag is inactive, the procedure proceeds to Step S28, in which the controller (55) determines whether the oxygen priority control has been currently selected or not. If the oxygen priority control has not been selected in Step S28, the controller (55) finishes the determination.

If the oxygen priority control has been selected in Step S28, the procedure proceeds to Step S29, in which the controller (55) determines whether one of the following three conditions: the sum of the carbon dioxide concentration and oxygen concentration of the inside air is more than 22%; the current carbon dioxide concentration of the inside air has increased by 2% or more as compared to that 30 minutes ago; and the current carbon dioxide concentration of the inside air has increased by 1% or more as compared to that 5 minutes ago is met or not. If none of the three conditions is met in Step S29, the controller (55) finishes the determination. Thus, the currently selected priority control, i.e., the oxygen priority control, is continued.

If any one of the three conditions is met in Step S29, that is, if the sum of the carbon dioxide concentration and oxygen concentration of the inside air is more than 22%, if the current carbon dioxide concentration of the inside air has increased by 2% or more as compared to that 30 minutes ago, or if the current carbon dioxide concentration of the inside air has increased by 1% or more as compared to that 5 minutes ago, the procedure proceeds to Step S30, in which the controller (55) determines to perform the carbon dioxide priority control, sets the carbon dioxide priority flag active (saves "Y"), and finishes the determination.

As can be seen, the controller (55) performs the priority determination when the power of the CA system (60) is turned on and the priority determination during the concentration control operation in different procedures, so as to determine which of the oxygen priority control and the carbon dioxide priority control is performed.

Further, as described above, if it is determined to perform the oxygen priority control in the priority determination, the controller (55) sets the carbon dioxide priority flag inactive. If it is determined to perform the carbon dioxide priority control, the controller (55) sets the carbon dioxide priority flag active. Irrespective of the result of the priority determination, the controller (55) resets the carbon dioxide priority flag if a predetermined reset condition is met. The predetermined reset condition includes, for example, a condition that the operation mode has changed to the air composition controlling mode during the concentration control operation, a condition that one day or more has passed since the stop of the CA system (60) (including the case where its power is turned off), or a condition that performance validation of various components is being conducted. Note that the carbon dioxide priority flag is inactive in an initial state.

«Oxygen Priority Control»

In the oxygen priority control in the oxygen concentration lowering mode, the oxygen concentration of the inside air is controlled in preference to the carbon dioxide concentration. At the onset of the oxygen priority control, the oxygen concentration of the air in the container (11) is higher than the target oxygen concentration $SPO_2$. Thus, irrespective of the carbon dioxide concentration of the inside air, the controller (55) performs the gas supply operation simultaneously with the onset of the control (start of the oxygen concentration lowering mode), thereby quickly lowering the oxygen concentration of the inside air. The control will be described in detail below.

The case where the target oxygen concentration $SPO_2$ is 5%, and the target carbon dioxide concentration $SPCO_2$ is 5% will be described below. Further, in this example, the composition of the air in the container (11) which is identical to the composition of the atmospheric air is controlled to a desired composition (5% oxygen and 5% carbon dioxide).

First, when it is determined to perform the oxygen priority control through the priority determination described above, the controller (55) performs the gas supply operation and the exhaust operation. Thus, the nitrogen-enriched air is supplied into the container (11), and the inside air is exhausted out of the container by the amount of the nitrogen-enriched air supplied. Through the gas supply operation and exhaust operation thus performed, the air in the container (11) is replaced with the nitrogen-enriched air, thereby lowering the oxygen concentration of the inside air.

When the oxygen concentration of the air in the container (11) is reduced to the oxygen concentration of the nitrogen-enriched air (e.g., 10%), the controller (55) stops the operation of the gas supply device (30) to stop the gas supply operation, and closes the exhaust valve (46b) to stop the exhaust operation.

When the gas supply operation and the exhaust operation are stopped, the air in the container (11) is no longer replaced, but the plants (15) keep breathing. Therefore, the oxygen concentration of the air in the container (11) decreases and the carbon dioxide concentration of the air in the container (11) increases. As a result, the air in the container will eventually reach the target oxygen concentration $SPO_2$ (5%) and the target carbon dioxide concentration $SPCO_2$ (5%).

When the oxygen concentration of the inside air reaches or falls below the target oxygen concentration $SPO_2$ (5%), the controller (55) finishes the control in the oxygen concentration lowering mode, and starts the control in the air composition controlling mode.

«Carbon Dioxide Priority Control»

In the carbon dioxide priority control, the carbon dioxide concentration of the inside air is controlled in preference to the oxygen concentration. At the onset of the carbon dioxide priority control, just like at the onset of the oxygen priority control, the oxygen concentration of the air in the container (11) is higher than the target oxygen concentration $SPO_2$. In the carbon dioxide priority control, unlike the oxygen priority control, the controller (55) does not always perform the gas supply operation simultaneously with the onset of the control (onset of the oxygen concentration lowering mode). Instead, the gas supply operation is performed in accordance with the carbon dioxide concentration of the inside air, as a result of which the oxygen concentration of the inside air is lowered, while keeping the carbon dioxide concentration of the inside air around the target carbon dioxide concentration $SPCO_2$. The control will be described in detail below.

It will be described below the case where the target oxygen concentration $SPO_2$ is 5%, and the target carbon dioxide concentration $SPCO_2$ is 13%. Further, in this example, the composition of the air in the container (11) which is identical to the composition of the atmospheric air is controlled to a desired composition (5% oxygen and 13% carbon dioxide).

First, if it is determined in the priority determination to perform the carbon dioxide priority control, the controller (55) determines whether the carbon dioxide concentration of the inside air measured by the carbon dioxide sensor (52) has reached a predetermined onset concentration (e.g., 13.5%) which is higher than the target carbon dioxide concentration $SPCO_2$ (13% in this embodiment).

If the carbon dioxide concentration of the inside air is equal to or higher than the onset concentration (13.5%), the gas supply operation and the exhaust operation are started. Thus, the nitrogen-enriched air is supplied into the container (11), and the inside air is exhausted out of the container by the amount of the nitrogen-enriched air supplied. Through the gas supply operation and exhaust operation thus performed, the air in the container (11) is replaced with the nitrogen-enriched air, thereby lowering the oxygen concentration of the inside air.

Figure 10:
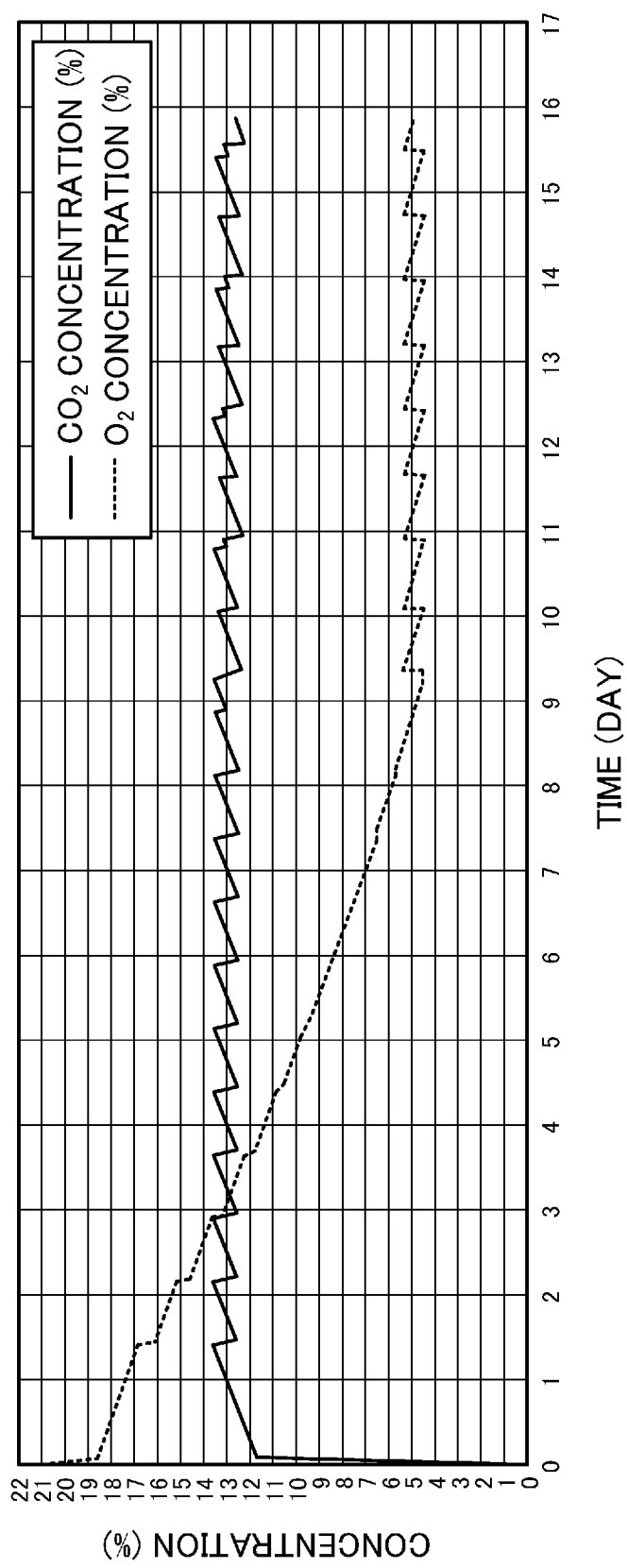
FIG. 10 is a graph illustrating variation with time of a carbon dioxide concentration and oxygen concentration of inside air under carbon dioxide priority control by the CA system of the embodiment.

As shown in FIG. 10, if carbon dioxide is introduced into the container (11) and the carbon dioxide concentration of the inside air is lower than the onset concentration (13.5%), e.g., 11.8%, the gas supply operation and the exhaust operation are not performed until the carbon dioxide concentration of the inside air reaches the onset concentration through the breathing of the plants (15). Then, when the carbon dioxide concentration of the inside air has reached the onset concentration, the gas supply operation and the exhaust operation are performed. Thus, the nitrogen-enriched air is supplied into the container (11), and the inside air is exhausted out of the container by the amount of the nitrogen-enriched air supplied. Through the gas supply operation and exhaust operation thus performed, the air in the container (11) is replaced with the nitrogen-enriched air, thereby lowering the oxygen concentration of the inside air.

If the carbon dioxide concentration of the inside air has lowered to a critical concentration (e.g., 12.5%) lower than the target carbon dioxide concentration $SPCO_2$ (13%) before the oxygen concentration of the inside air of the container (11) reaches the target oxygen concentration $SPO_2$ (5%), the controller (55) stops the operation of the gas supply device (30) to stop the gas supply operation, and closes the exhaust valve (46b) to stop the exhaust operation.

When the gas supply operation and the exhaust operation are stopped, the air in the container (11) is no longer replaced, but the plants (15) keep breathing. Therefore, the oxygen concentration of the air in the container (11) decreases and the carbon dioxide concentration of the air in the container (11) increases. Thus, the carbon dioxide concentration of the inside air approaches the target carbon dioxide concentration $SPCO_2$ (13%).

Once the carbon dioxide concentration of the air in the container (11) has increased to a restart concentration (13.5%) higher than the target carbon dioxide concentration $SPCO_2$ (13%), the controller (55) restarts the operation of the gas supply device (30) to restart the gas supply operation, and opens the exhaust valve (46b) to restart the exhaust operation. Thus, the air in the container (11) is replaced with the nitrogen-enriched air, and the oxygen concentration of the air in the container (11) is lowered again.

Thereafter, if the carbon dioxide concentration of the inside air has lowered again to the critical concentration (e.g., 12.5%) lower than the target carbon dioxide concentration $SPCO_2$ (13%) before the oxygen concentration of the air in the container (11) reaches the target oxygen concentration $SPO_2$ (5%), the controller (55) stops the operation of the gas supply device (30) to stop the gas supply operation, and closes the exhaust valve (46b) to stop the exhaust operation.

In this way, the controller (55) repeats the restart and stop of the gas supply operation and the exhaust operation until the oxygen concentration of the air in the container (11) reaches the target oxygen concentration $SPO_2$ (5%). Repeating the restart and stop of the gas supply operation and the exhaust operation lowers the oxygen concentration of the inside air while keeping the carbon dioxide concentration of the inside air around the target carbon dioxide concentration $SPCO_2$ (13%), and soon after, the oxygen concentration of the inside air reaches the target oxygen concentration $SPO_2$ (5%).

After that, when the oxygen concentration of the inside air reaches or falls below the target oxygen concentration $SPO_2$ (5%), the controller (55) finishes the control in the oxygen concentration lowering mode, and starts the control in the air composition controlling mode.

[Air Composition Controlling Mode]

«Control of Oxygen Concentration»

In the air composition controlling mode, the controller (55) restarts the gas supply operation by the gas supply device (30) and the exhaust operation by the exhaust portion (46) if the oxygen concentration of the inside air falls below a lower limit value which is lower than the target oxygen concentration $SPO_2$ only by a predetermined concentration X (e.g., 0.5%). Through the gas supply operation and exhaust operation thus performed, the inside air is replaced with the nitrogen-enriched air having a higher oxygen concentration (e.g., a mean oxygen concentration of 8%) than the inside air. Thus, the oxygen concentration of the inside air of the container (11) increases.

The controller (55) stops the gas supply operation and the exhaust operation when the oxygen concentration of the inside air reaches or exceeds a value higher than the target oxygen concentration $SPO_2$ by the predetermined concentration X (e.g., 0.5%).

The oxygen concentration of the inside air may be controlled through an outside air introduction operation, instead of performing the gas supply operation. In the outside air introduction operation, the bypass on-off valve (72) is opened to allow the outside air sucked into the air pump (31) to bypass the first and second adsorption columns (34, 35) and flow directly into the container (11). Through the outside air introduction operation and the exhaust operation thus performed, the inside air is replaced with the outside air having an oxygen concentration of 21%. Thus, the oxygen concentration of the air in the container (11) increases.

«Control of Carbon Oxide Concentration»

In the air composition controlling mode, the controller (55) performs the gas supply operation and the exhaust operation when the carbon dioxide concentration of the inside air reaches, or exceeds an upper limit value which is higher than the target carbon dioxide concentration $SPCO_2$ only by a predetermined concentration Y (e.g., 0.5%). Through the gas supply operation and exhaust operation thus performed, the inside air is replaced with the nitrogen-enriched air. Thus, the carbon dioxide concentration of the air in the container (11) is lowered.

When the carbon dioxide concentration of the inside air falls below a certain value which is lower than the target carbon dioxide concentration $SPCO_2$ only by the predetermined concentration Y, the controller (55) stops the gas supply operation and the exhaust operation.

The carbon dioxide concentration of the inside air may be controlled through the outside air introduction operation with the bypass on-off valve (72) open, instead of the gas supply operation. Through the outside air introduction operation and exhaust operation thus performed, the inside air is replaced with the outside air having a carbon dioxide concentration of 0.03%. Thus, the carbon dioxide concentration of the air in the container (11) is lowered.

<Example of Control in Oxygen Concentration Lowering Mode>

As an example of the control in the oxygen concentration lowering mode, it will be described below an initial introduction example in which the carbon dioxide priority control is performed from the beginning of the concentration control operation, and an intermediate introduction example in which the carbon dioxide priority control is performed in the middle of the oxygen priority control.

<<Initial Introduction Example>>

Figure 11:
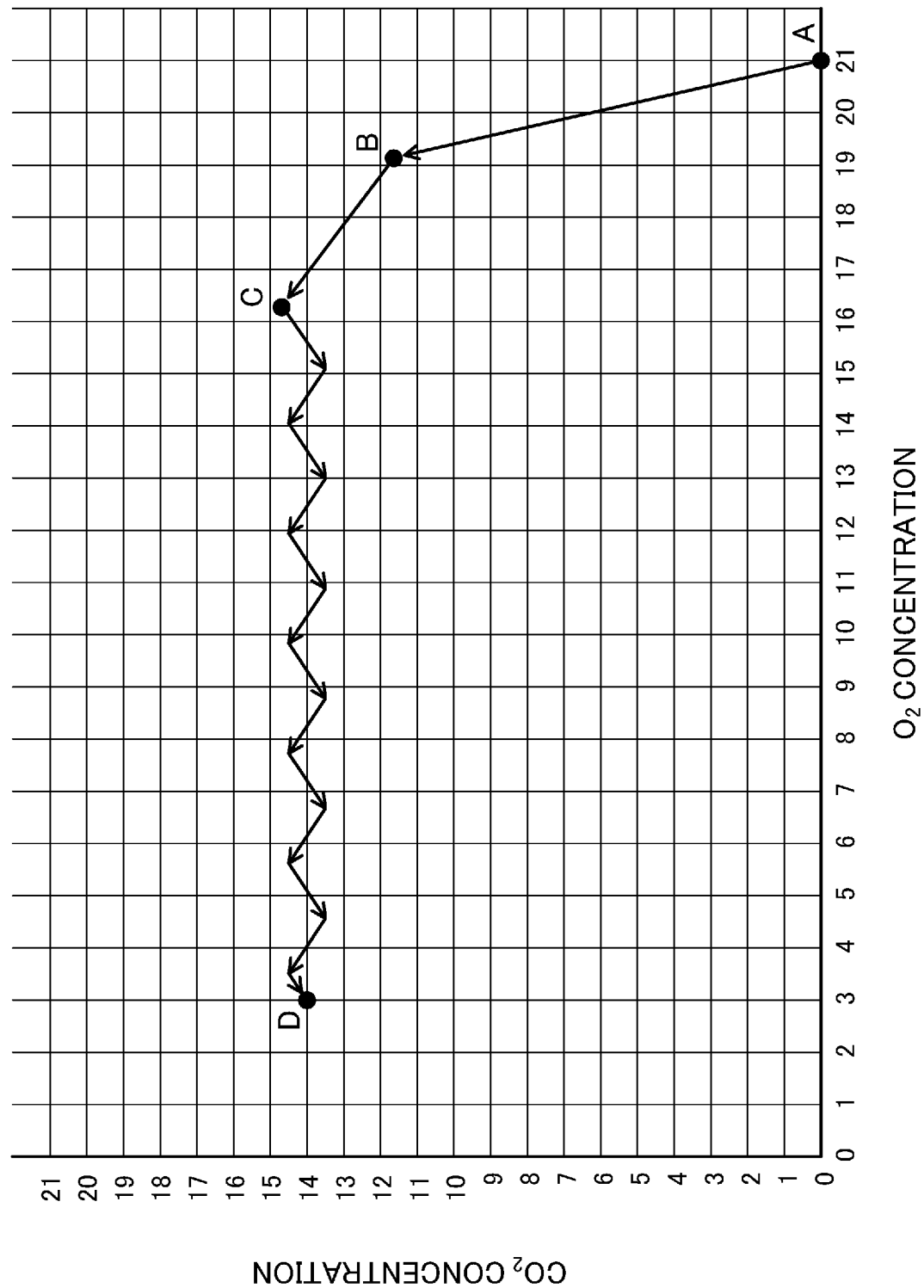
FIG. 11 is a graph illustrating how the composition of the inside air varies in an initial introduction example in which carbon dioxide is introduced into a container before the CA system of the embodiment starts the concentration control operation so as to start the carbon dioxide priority control from the beginning of the concentration control operation.

As shown in FIG. 11, when carbon dioxide is introduced into the container (11) that has been loaded with the plants (15) before the CA system (60) starts the concentration control operation, the carbon dioxide concentration of the inside air increases, and the inside air is released out of the container (11) by the amount of carbon dioxide introduced. Thus, the oxygen concentration of the inside air decreases (from point A to point B in FIG. 11).

When the introduction of carbon dioxide into the container (11) is finished, the power of the CA system (60) is turned on and the concentration control operation starts (point B in FIG. 11). In this example, suppose that the target oxygen concentration $SPO_2$ is 3%, the target carbon dioxide concentration $SPCO_2$ is 14%, and the carbon dioxide concentration of the inside air after the carbon dioxide introduction is 11.8%.

The CA system (60) starts the concentration control operation in the oxygen concentration lowering mode, and performs the priority determination to be performed when the power of the CA system (60) is turned on as shown in FIG. 8. Since the target carbon dioxide concentration $SPCO_2$ is 14% in this example, the procedure proceeds from Step S1 to Step S2 of the priority determination shown in FIG. 8, and a determination is made to perform the carbon dioxide priority control. Then, the carbon dioxide priority control is performed.

The carbon dioxide concentration of the inside air at the onset of the concentration control operation is 11.8%, which falls below the onset concentration of the gas supply operation (e.g., 14.5%). Thus, the gas supply operation and the exhaust operation are not performed immediately, but a waiting period is set until the carbon dioxide concentration of the inside air reaches the onset concentration through the breathing of the plants (15) (from point B to point C in FIG. 11). Then, when the carbon dioxide concentration of the inside air has reached the onset concentration, the gas supply operation and the exhaust operation are performed (point C in FIG. 11).

Once the gas supply operation and the exhaust operation are started, the stop and restart of the gas supply operation and the exhaust operation are repeated in accordance with the carbon dioxide concentration of the inside air as described above, so that the oxygen concentration of the inside air is lowered, while keeping the carbon dioxide concentration of the inside air around the target carbon dioxide concentration $SPCO_2$ (14%) (from point C to point D in FIG. 11).

After that, when the oxygen concentration of the inside air reaches the target oxygen concentration $SPO_2$ (3%), the oxygen concentration lowering mode is changed to the air composition controlling mode, the carbon dioxide priority flag is reset (set inactive), and the carbon dioxide priority control is finished (point D in FIG. 11).

As can be seen, in the initial introduction example, carbon dioxide is introduced in the container that has been loaded with the plants (15) before the CA system (60) starts the concentration control operation, and the carbon dioxide priority control is performed from the beginning of the concentration control operation.

<<Intermediate Introduction Example>>

Figure 12:
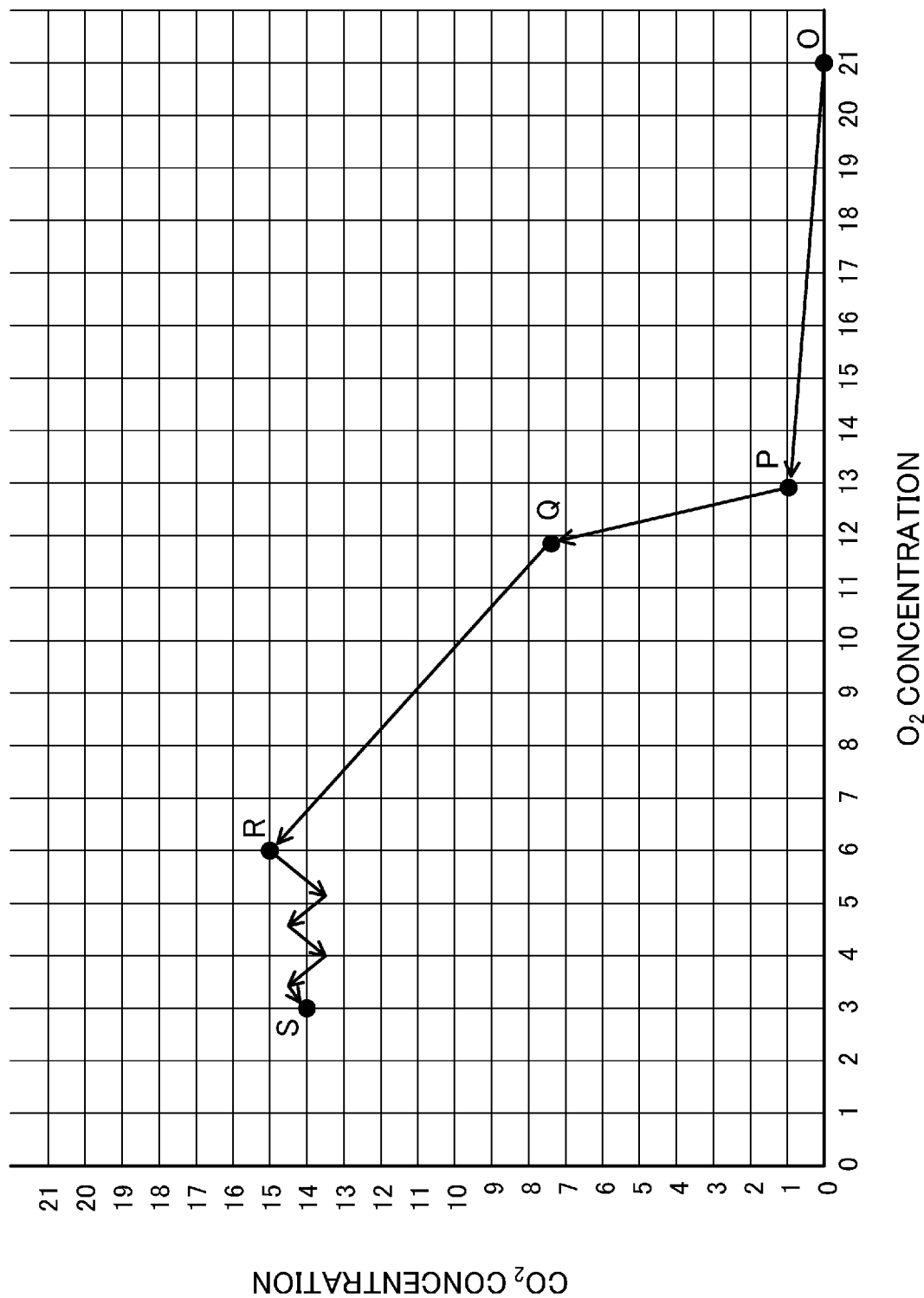
FIG. 12 is a graph illustrating how the composition of the inside air varies in an intermediate introduction example in which carbon dioxide is introduced into the container during oxygen priority control so as to start the carbon dioxide priority control in the middle of the oxygen priority control.

As shown in FIG. 12, without introducing carbon dioxide into the container (11) that has been loaded with the plants (15), the power of the CA system (60) is turned on and the concentration control operation starts (point O in FIG. 12). In this example, suppose that the concentration control operation starts when the target oxygen concentration $SPO_2$ is initially 5% and the target carbon dioxide concentration $SPCO_2$ is initially 5%, and then carbon dioxide is introduced in the container when the oxygen concentration the inside air has reached 13%.

The CA system (60) starts the concentration control operation in the oxygen concentration lowering mode, and performs the priority determination to be performed when the power of the CA system (60) is turned on as shown in FIG. 8. Since the target oxygen concentration $SPO_2$ is 5% and the target carbon dioxide concentration $SPCO_2$ is 5% in this example, the procedure proceeds from Step S1, Step S3, and Step S5. Further, since the carbon dioxide priority flag is initially inactive, the procedure proceeds from Step S5 to Step S7. Then, the procedure further proceeds to Step S9 and Step S11 because no gas is introduced into the container just after the onset of the operation and the inside air has the same composition as the atmospheric air. Thus, a determination is made to perform the oxygen priority control, and the oxygen priority control is performed. Thus, the nitrogen-enriched air is supplied into the container (11), and the inside air is exhausted out of the container by the amount of the nitrogen-enriched air supplied. Through the gas supply operation and exhaust operation thus performed, the air in the container (11) is replaced with the nitrogen-enriched air, thereby lowering the oxygen concentration of the inside air (from point O to point P in FIG. 12).

In this example, carbon dioxide is introduced into the container (11) while the oxygen concentration is decreasing through the oxygen priority control (point P in FIG. 12). The carbon dioxide concentration of the inside air increases as carbon dioxide is introduced into the container, and the inside air is released out of the container (11) by the amount of carbon dioxide introduced, thereby lowering the oxygen concentration of the inside air (from point P to point Q in FIG. 12).

Suppose that the target oxygen concentration $SPO_2$ is set to 3%, and the target carbon dioxide concentration $SPCO_2$ is set to 14% during the introduction of carbon dioxide into the container. Then, through the priority determination performed during the concentration control operation shown in FIG. 9, the procedure proceeds to Steps S21, S22, and S23, in which the CA system (60) determines to perform the carbon dioxide priority control, i.e., the control to be performed is changed from the oxygen priority control to the carbon dioxide priority control.

Suppose that the carbon dioxide concentration of the inside air has increased to 7.5% through the introduction of carbon dioxide into the container (11). The carbon dioxide concentration of the inside air at the onset of the carbon dioxide priority control is 7.5%, which falls below the onset concentration of the gas supply operation (e.g., 14.5%). Thus, the gas supply operation and the exhaust operation are not performed immediately, but a waiting period is set until the carbon dioxide concentration of the inside air reaches the onset concentration through the breathing of the plants (15) (from point Q to point R in FIG. 12). Then, when the carbon dioxide concentration of the inside air has reached the onset concentration, the gas supply operation and the exhaust operation are performed (point R in FIG. 12).

Once the gas supply operation and the exhaust operation are started, the stop and restart of the gas supply operation and the exhaust operation are repeated in accordance with the carbon dioxide concentration of the inside air as described above, so that the oxygen concentration of the inside air is lowered, while keeping the carbon dioxide concentration of the inside air around the target carbon dioxide concentration $SPCO_2$ (14%) (from point R to point S in FIG. 12).

After that, when the oxygen concentration of the inside air has reached the target oxygen concentration $SPO_2$ (3%), the oxygen concentration lowering mode is changed to the air composition controlling mode, the carbon dioxide priority flag is reset (set inactive), and the carbon dioxide priority control is finished (point S in FIG. 12).

In this way, the CA system (60) starts the concentration control operation without introducing carbon dioxide into the container (11) that has been loaded with the plants (15). Then, carbon dioxide is introduced into the container (11) to perform the carbon dioxide priority control in the middle of the oxygen priority control.

—Advantages of Embodiment—

As can be seen, according to this embodiment, the carbon dioxide priority control is performed in the following manner. In the carbon dioxide priority control, when the oxygen concentration of the inside air is equal to or higher than a predetermined ceiling concentration which is higher than the target oxygen concentration, the gas supply operation is performed. Then, when the carbon dioxide concentration of the inside air is lowered to a critical concentration lower than the target carbon dioxide concentration, the gas supply operation is stopped. When the carbon dioxide concentration of the inside air reaches the restart concentration (13.5% in this embodiment) which is higher than the target carbon dioxide concentration through the breathing of the plants (15) while the gas supply operation is being stopped, the gas supply operation is restarted. In the carbon dioxide priority control, the gas supply operation is performed or stopped in accordance with the carbon dioxide concentration of the inside air. Thus, in a situation where the oxygen concentration of the inside air needs to be lowered, the oxygen concentration of the inside air can be lowered to the target oxygen concentration, while keeping the carbon dioxide concentration of the inside air around the target carbon dioxide concentration. Therefore, unlike commonly known apparatuses, the carbon dioxide concentration does not significantly decrease with the decrease in the oxygen concentration of the inside air due to the gas supply operation performed continuously after the introduction of carbon dioxide. Thus, the plants in the container can be kept fresh even if it is important for the plants to keep the carbon dioxide concentration of the inside air high rather than to keep the oxygen concentration of the inside air low.

Once the gas supply operation is started, the oxygen concentration of the inside air decreases, and the carbon dioxide concentration of the inside air also decreases. Thus, if the gas supply operation is started when the carbon dioxide concentration of the inside air is low, the carbon dioxide concentration of the inside air is further lowered, instead of increasing it to the target carbon dioxide concentration. As a result, it takes long time to bring the carbon dioxide concentration to the target carbon dioxide concentration.

To cope with this drawback, according to this embodiment, if the carbon dioxide concentration of the inside air at the onset of the carbon dioxide priority control is lower than a predetermined onset concentration higher than the target carbon dioxide concentration, the gas supply operation is not performed until the carbon dioxide concentration of the inside air reaches the onset concentration through the breathing of the plants (15). Then, the gas supply operation is performed when the carbon dioxide concentration of the indoor has reached the onset concentration. Performing the gas supply operation after the carbon dioxide concentration has reached the onset concentration makes it possible to quickly bring the carbon dioxide concentration of the inside air to the target carbon dioxide concentration after the onset of the carbon dioxide priority control. Thus, according to the above-described control, the carbon dioxide concentration of the inside air can be kept around the target carbon dioxide concentration more quickly than the case where the gas supply operation is started just after the onset of the carbon dioxide priority control. Therefore, the composition of the inside air can be quickly controlled to be a suitable one for keeping the freshness of the plants which require the carbon dioxide concentration to be kept high.

Further, in this embodiment, the controller (55) selectively performs the oxygen priority control and the carbon dioxide priority control. In the oxygen priority control, the gas supply operation is performed to lower the oxygen concentration of the inside air, irrespective of the carbon dioxide concentration of the inside air, when the oxygen concentration of the inside air is equal to or higher than the ceiling concentration higher than the target oxygen concentration. In the carbon dioxide priority control, the gas supply operation is controlled in accordance with the carbon dioxide concentration of the inside air to lower the oxygen concentration, while keeping the carbon dioxide concentration of the inside air around the target carbon dioxide concentration. In this configuration, for example, the oxygen priority control can be performed if the container is loaded with plants for which it is important to keep the oxygen concentration of the inside air low rather than to control the carbon dioxide concentration to be the target carbon dioxide concentration, and the carbon dioxide priority control can be performed if the container is loaded with plants for which it is important to keep the carbon dioxide concentration high rather than to keep the oxygen concentration low. This can keep the freshness of a variety of plants.

Still further, in this embodiment, when the oxygen concentration of the inside air is equal to or higher than the ceiling concentration higher than the target oxygen concentration, and needs to be lowered, the controller (55) performs a predetermined priority determination of determining which of the carbon dioxide priority control or the oxygen priority control is performed, and then performs the selected control. This can eliminate the need for a worker to select the oxygen priority control or the carbon dioxide priority control by himself or herself. The control to be performed can be automatically determined through the priority determination by the controller (55), and can be automatically performed. Thus, inappropriate control due to mishandling by the worker would not occur. This can keep the freshness of the plants (15) with high reliability.

Moreover, in this embodiment, if the target carbon dioxide concentration is higher than the predetermined value, the controller (55) estimates that priority should be given not to the lowering of the oxygen concentration of the inside air, but to the keeping of the carbon dioxide concentration of the inside air around the target carbon dioxide concentration, and thus, determines in the priority determination to perform the carbon dioxide priority control. Thus, the priority determination can be made only in accordance with the target carbon dioxide concentration without measuring the carbon dioxide concentration of the inside air.

Note that the gas supply operation merely reduces the oxygen concentration and carbon dioxide concentration of the inside air. Therefore, the sum of the oxygen concentration and carbon dioxide concentration of the inside air would not exceed 21%, which is the sum of the oxygen concentration and carbon dioxide concentration of the atmospheric air.

In this embodiment, if the sum of the oxygen concentration and carbon dioxide concentration of the inside air is more than 22%, which is a predetermined reference concentration equal to or higher than 21%, the controller (55) estimates that carbon dioxide has been introduced into the container (11), and that priority should be given not to the lowering of the oxygen concentration of the inside air, but to the keeping of the carbon dioxide concentration of the inside air around the target carbon dioxide concentration. Then, the controller (55) determines in the priority determination to perform the carbon dioxide priority control. Thus, the priority determination can be easily made only through measurement and calculation of the oxygen concentration and carbon dioxide concentration of the inside air.

Note that the gas supply operation merely reduces the carbon dioxide concentration of the inside air. Therefore, while the CA system (60) is running, the carbon dioxide concentration of the inside air would not increase in a predetermined period by an amount larger than the amount of carbon dioxide increased through the breathing of the plants (15).

Therefore, in this embodiment, if the carbon dioxide concentration of the inside air has increased by an amount equal to or more than the amount of carbon dioxide increased through the breathing of the plants (15) in a predetermined period, the controller (55) estimates that carbon dioxide has been introduced into the container (11), and that priority should be given not to the lowering of the oxygen concentration of the inside air, but to the keeping of the carbon dioxide concentration of the inside air around the target carbon dioxide concentration through the introduction of carbon dioxide into the container (11). Then, the controller (55) determines in the priority determination to perform the carbon dioxide priority control. Thus, the priority determination can be easily made only through measurement of the carbon dioxide concentration of the inside air and calculation of the amount increased.

Note that when the power of the CA system (60) is off, the composition of the inside air varies only through the breathing of the plants (15). Thus, if the power of the CA system (60) is turned on before one day passes since the turning off of the power of the CA system (60), the carbon dioxide concentration of the inside air does not increase in a period between the turning off and the turning on by an amount more than the amount increased through the breathing of the plants (15).

Therefore, in this embodiment, if the power of the CA system (60) is turned on before one day passes since the turning of the power of the CA system (60) from on to off and the carbon dioxide concentration of the inside air has increased by an amount equal to or more than the predetermined amount just before the power of the CA system (60) was turned off, the controller (55) estimates that carbon dioxide has been introduced into the container (11) while the power of the CA system (60) is off, and that priority should be given to, not the lowering of the oxygen concentration of the inside air, but the keeping of the carbon dioxide concentration of the inside air around the target carbon dioxide concentration. Then, the controller (55) determines in the priority determination to perform the carbon dioxide priority control. Thus, the priority determination can be easily made only through measurement of the carbon dioxide concentration of the inside air and calculation of the amount increased.

In some cases, the power of the CA system (60) may be unintentionally turned off even if the carbon dioxide priority control is being performed in accordance with a determination to perform the carbon dioxide priority control through the priority determination.

Thus, in this embodiment, having determined to perform the carbon dioxide priority control through the priority determination, the controller (55) sets the carbon dioxide priority flag active. If the carbon dioxide priority flag is active when the power of the CA system (60) is turned from off to on, the controller (55) estimates in the priority determination that the carbon dioxide priority control needs to be continued, and continues the carbon dioxide priority control. Therefore, even in a case where the power of the CA system (60) is unintentionally turned off even if the carbon dioxide priority control is being performed in accordance with a determination to perform the carbon dioxide priority control, the carbon dioxide priority control can be easily continued without making any determination in the priority determination because the carbon dioxide priority flag is active.

In addition, this embodiment can provide a container refrigeration apparatus (10) including the CA system (60) capable of lowering the oxygen concentration of the inside air, while keeping the carbon dioxide concentration of the inside air around the target carbon dioxide concentration.

<<Other Embodiments>>

The target oxygen concentration $SPO_2$ and target carbon dioxide concentration $SPCO_2$ mentioned in the above embodiment are merely examples, and are not limited to the values described above.

Further, the priority determination described in the above embodiment is not also limited to the one described above, and can be any kind of determination as long as it can detect a status for which the carbon dioxide priority control is definitely required, such as a status in which carbon dioxide has been introduced in the container, or conversely, a status for which the carbon dioxide priority control is definitely unnecessary.

The ceiling concentration, critical concentration, restart concentration, and onset concentration described in the embodiment are merely examples, and do not limit the ceiling concentration, critical concentration, restart concentration, and onset concentration of the present invention.

In Steps S7 and S29 of the priority determination described above, the concentration 22% to be compared with the sum of the carbon dioxide concentration and oxygen concentration of the inside air is an example of a predetermined reference concentration equal to or higher than 21%, which is the sum of the carbon dioxide concentration and oxygen concentration of the atmospheric air. The reference concentration may be equal to or higher than 22%, such as 23% or 24%, or may be equal to or lower than 22% as long as it is equal to or higher than 21%.

In the above embodiment, the nitrogen-enriched air has been produced in the gas supply device (30) using an adsorbent absorbing a nitrogen component in a compressed state. Alternatively, the nitrogen-enriched air may be produced using activated carbon adsorbing an oxygen component as the adsorbent.

In addition, in the above embodiment, the CA system (60) of the present invention has been applied to a container refrigeration apparatus (10) provided for a container (11) for use in marine transportation. However, the CA system (60) of the present invention is not limited to such applications. The CA system (60) of the present invention may be used to control the composition of the air in, not only a container for use in marine transportation, but also a container for use in land transportation, a simple refrigerated storage, a normal temperature storage, or any other suitable storage, for example.

INDUSTRIAL APPLICABILITY

As can be seen from the foregoing description, the present invention is useful as an inside air control system which controls the composition of the air in a storage for storing plants, and a container refrigeration apparatus including the inside air control system.

DESCRIPTION OF REFERENCE CHARACTERS

10 Container Refrigeration Apparatus
11 Container (Storage)
15 Plant
30 Gas Supply Device
55 Controller
60 CA System (Inside Air Control System)

The invention claimed is:

1. An inside air control system comprising:
a gas supply device which includes an air pump and performs a gas supply operation of supplying, by the air pump, nitrogen-enriched air having a higher nitrogen concentration and a lower oxygen concentration than outside air into a storage storing breathing plants; and
a controller which controls the gas supply operation so that inside air of the storage has a desired composition, wherein
the controller performs carbon dioxide priority control in which
the controller performs the gas supply operation if an oxygen concentration of the inside air is equal to or higher than a ceiling concentration higher than a target oxygen concentration, stops the gas supply operation if a carbon dioxide concentration of the inside air is lowered to a critical concentration lower than a target carbon dioxide concentration regardless of the oxygen concentration, and
restarts the gas supply operation if the carbon dioxide concentration of the inside air has reached a restart concentration higher than the target carbon dioxide concentration through breathing of the plants while the gas supply operation is being stopped.

2. The inside air control system of claim 1, wherein if the carbon dioxide concentration of the inside air is lower than a predetermined onset concentration higher than the target carbon dioxide concentration at an onset of the carbon dioxide priority control, the controller does not perform the gas supply operation until the carbon dioxide concentration of the inside air reaches the predetermined onset concentration through breathing of the plants, and performs the gas supply operation after the carbon dioxide concentration of the inside air has reached the predetermined onset concentration.

3. The inside air control system of claim 1, wherein the controller selectively performs the carbon dioxide priority control and an oxygen priority control in which, if the oxygen concentration of the inside air is equal to or higher than the ceiling concentration, the gas supply operation is performed to lower the oxygen concentration of the inside air, irrespective of the carbon dioxide concentration of the inside air.

4. A container refrigeration apparatus comprising:
an inside air control system of claim 1; and
a refrigerant circuit which performs a refrigeration cycle, wherein
the container refrigeration apparatus cools inside air of a container serving as the storage, and controls a composition of the inside air.

5. An inside air control system comprising:
a gas supply device which includes an air pump and performs a gas supply operation of supplying, by the air pump, nitrogen-enriched air having a higher nitrogen concentration and a lower oxygen concentration than outside air into a storage storing breathing plants; and
a controller which controls the gas supply operation so that inside air of the storage has a desired composition, wherein
the controller performs carbon dioxide priority control in which
the controller performs the gas supply operation if an oxygen concentration of the inside air is equal to or higher than a ceiling concentration higher than a target oxygen concentration, stops the gas supply operation if a carbon dioxide concentration of the inside air is lowered to a critical concentration lower than a target carbon dioxide concentration, and
restarts the gas supply operation if the carbon dioxide concentration of the inside air has reached a restart concentration higher than the target carbon dioxide concentration through breathing of the plants while the gas supply operation is being stopped, wherein
the controller selectively performs the carbon dioxide priority control and an oxygen priority control in which, if the oxygen concentration of the inside air is equal to or higher than the ceiling concentration, the gas supply operation is performed to lower the oxygen concentration of the inside air, irrespective of the carbon dioxide concentration of the inside air, and
the controller performs, if the oxygen concentration of the inside air is equal to or higher than the ceiling concentration, a predetermined priority determination to determine which of the oxygen priority control and the carbon dioxide priority control is performed.

6. The inside air control system of claim 5, wherein the controller determines to perform the carbon dioxide priority control through the priority determination if the target carbon dioxide concentration is higher than a predetermined value.

7. The inside air control system of claim 5, wherein the controller determines to perform the carbon dioxide priority control through the priority determination if the sum of the oxygen concentration and carbon dioxide concentration of the inside air is higher than a predetermined reference concentration which is equal to or higher than 21%.

8. The inside air control system of claim 5, wherein the controller determines to perform the carbon dioxide priority control through the priority determination if the carbon dioxide concentration of the inside air has increased by a value equal to or higher than a predetermined value in a predetermined period during the gas supply operation.

9. The inside air control system of claim 5, wherein the controller determines to perform the carbon dioxide priority control through the priority determination if the power of the inside air control system is turned on within one day of turning of the power of the inside air control system from on to off and the carbon dioxide concentration of the inside air has increased by a value equal to or higher than a predetermined value as compared to the carbon dioxide concentration of the inside air just before the power of the inside air control system was turned off.

10. The inside air control system of claim 5, wherein
the controller sets a carbon dioxide priority flag active if the controller has determined to perform the carbon dioxide priority control through the priority determination, and sets the carbon dioxide priority flag inactive if the controller has determined to perform the oxygen priority control through the priority determination or a predetermined reset condition is met, and
the controller determines to perform the carbon dioxide priority control through the priority determination if the power of the inside air control system has been turned from off to on and the carbon dioxide priority flag is active.

* * * * *